US011297319B2

(12) United States Patent
Chen et al.

(10) Patent No.: US 11,297,319 B2
(45) Date of Patent: Apr. 5, 2022

(54) METHOD FOR ENCODING IMAGES AND CORRESPONDING TERMINALS

(71) Applicant: SAMSUNG ELECTRONICS CO., LTD., Gyeonggi-do (KR)

(72) Inventors: Jie Chen, Beijing (CN); Jongbum Choi, Gyeonggi-do (KR); Fan Wang, Beijing (CN); Xiao Quyang, Beijing (CN); Zhuoyi Lv, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/967,059

(22) PCT Filed: Jan. 22, 2020

(86) PCT No.: PCT/KR2020/001131
§ 371 (c)(1),
(2) Date: Aug. 3, 2020

(87) PCT Pub. No.: WO2020/159154
PCT Pub. Date: Aug. 6, 2020

(65) Prior Publication Data
US 2021/0235085 A1   Jul. 29, 2021

(30) Foreign Application Priority Data

Jan. 29, 2019   (CN) .......................... 201910087815.0

(51) Int. Cl.
*H04N 19/124*   (2014.01)
*H04N 19/587*   (2014.01)
*H04N 19/59*    (2014.01)

(52) U.S. Cl.
CPC ......... *H04N 19/124* (2014.11); *H04N 19/587* (2014.11); *H04N 19/59* (2014.11)

(58) Field of Classification Search
CPC ..... H04N 19/124; H04N 19/587; H04N 19/59
See application file for complete search history.

(56) References Cited

U.S. PATENT DOCUMENTS

| 9,020,286 | B2  | 4/2015 | Lee et al. |
| 2013/0142250 | A1* | 6/2013 | Berbecel ............. H04N 19/124 |
| | | | 375/240.03 |

(Continued)

FOREIGN PATENT DOCUMENTS

| WO | WO2018199459 | 11/2018 | |
| WO | WO 2018199459 A1 * | 11/2018 | ........... H04N 19/176 |

OTHER PUBLICATIONS

WO 2018199459 A1 translaton Nov. 2018.*

(Continued)

*Primary Examiner* — Mohammed S Rahaman
(74) *Attorney, Agent, or Firm* — The Farrell Law Firm, P.C.

(57) ABSTRACT

The present invention provides a method for encoding an image and corresponding terminals. The method includes steps of: determine the related coding information of the raw image to be processed according to the feature information of the raw image to be processed; and encode the raw image to be processed according to the related coding information. In the present invention, the encoded raw image is transmitted to a cloud server via network, and the decoded and reconstructed raw image is optimized by the ISP module in the cloud server. Compared with the prior art where complex algorithms cannot be implemented by the ISP module in the terminal due to the limitation of its computing capacity, the present invention significantly improves the perceptual quality of the user viewing image by adopting more sophisticated image processing algorithms, while increasing the image compression ratio.

13 Claims, 21 Drawing Sheets

(56) References Cited

U.S. PATENT DOCUMENTS

| | | | |
|---|---|---|---|
| 2013/0163891 A1* | 6/2013 | Bajpai | H04N 19/176 |
| | | | 382/233 |
| 2016/0117572 A1 | 4/2016 | Bhardwaj et al. | |
| 2016/0337668 A1* | 11/2016 | Le Leannec | H04N 19/103 |
| 2018/0184084 A1* | 6/2018 | Jeon | H04N 19/142 |
| 2019/0005360 A1* | 1/2019 | Heide | G06T 5/001 |
| 2019/0246112 A1* | 8/2019 | Li | G06K 9/036 |

OTHER PUBLICATIONS

PCT/ISA/210 Search Report issued on PCT/KR2020/001131, dated Apr. 28, 2020, pp. 3.
PCT/ISA/237 Written Opinion issued on PCT/KR2020/001131, dated Apr. 28, 2020, pp. 6.

* cited by examiner

[Fig. 1]
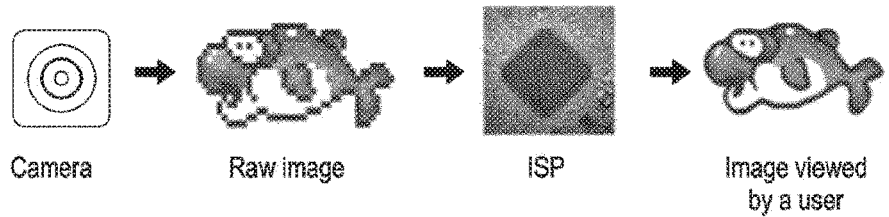
[Fig. 2]
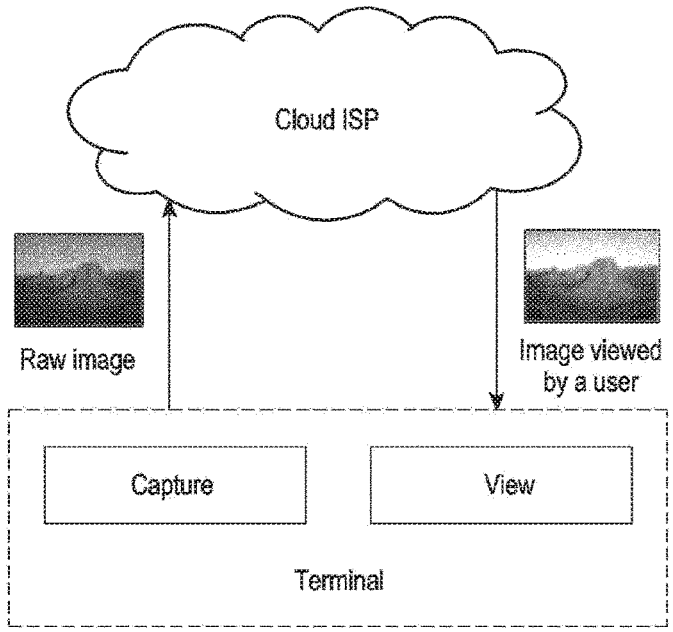
[Fig. 3]
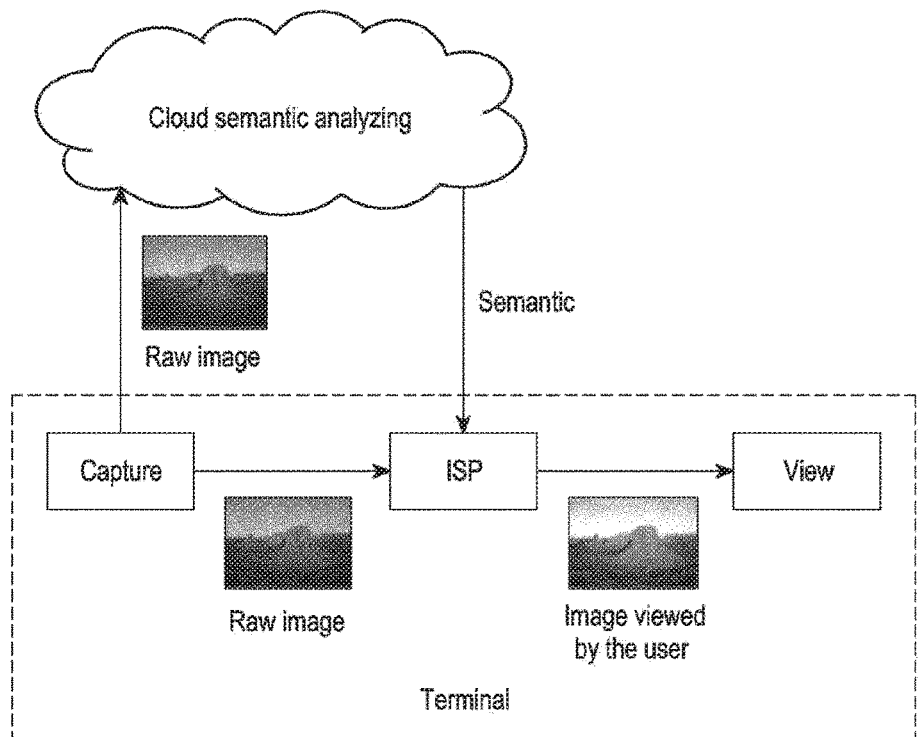

[Fig. 4a]
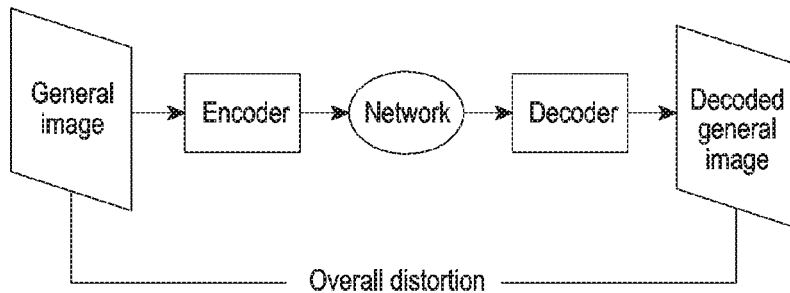
[Fig. 4b]
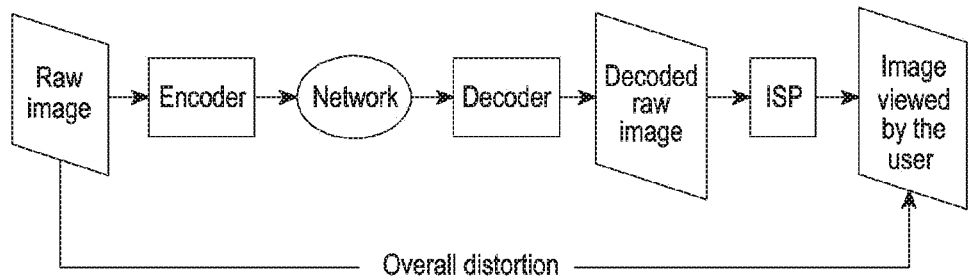
[Fig. 5]
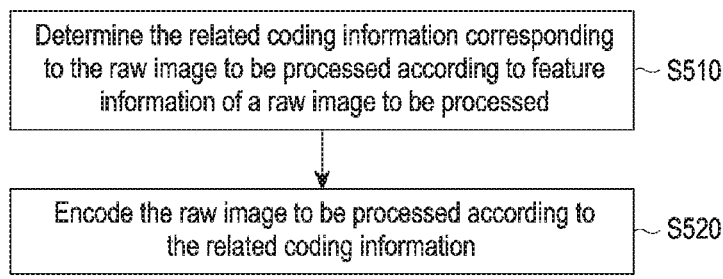

[Fig. 6]
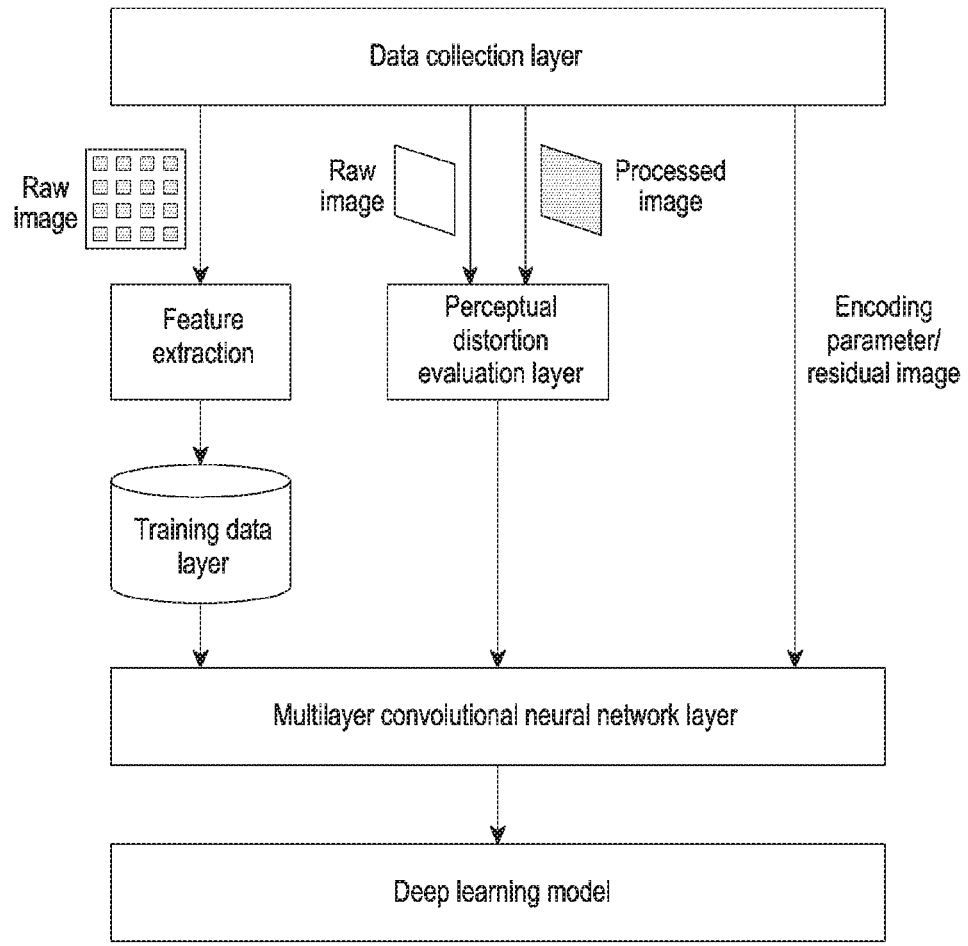
[Fig. 7]
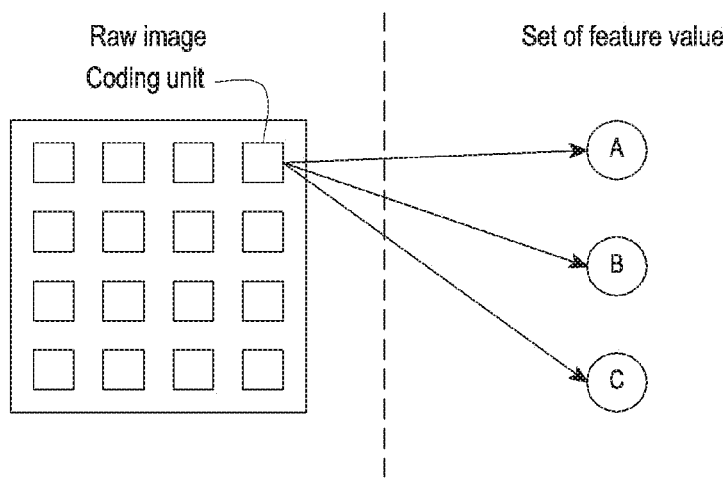

[Fig. 8]
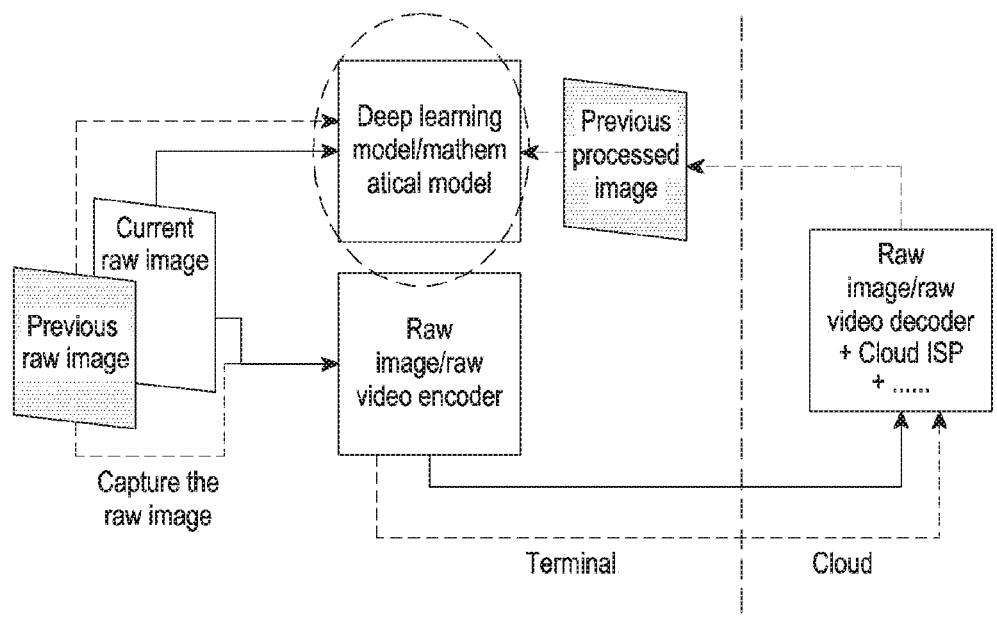
[Fig. 9a]
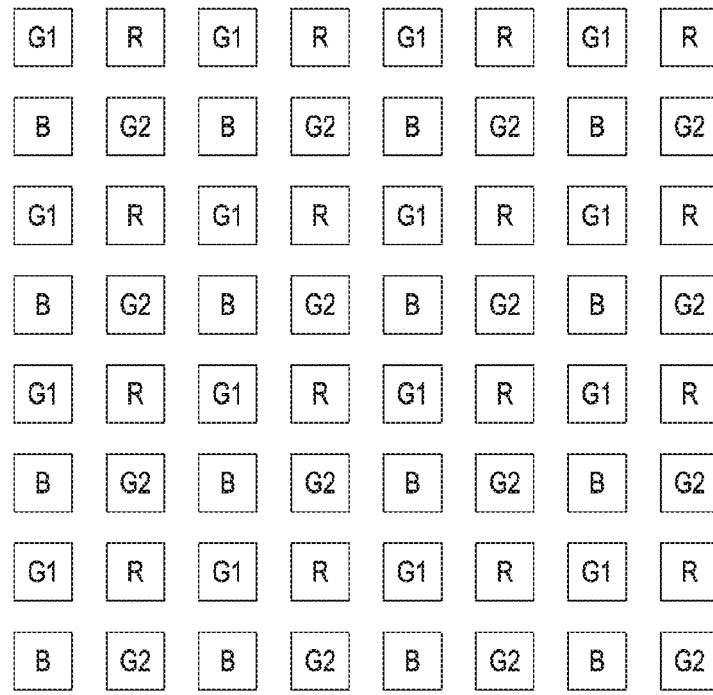

[Fig. 9b]

| Gl | Rs | Gl | Rl | Gl | Rs | Gl | Rl |
|----|----|----|----|----|----|----|----|
| Bs | Gs | Bl | Gs | Bs | Gs | Bl | Gs |
| Gl | Rl | Gl | Rs | Gl | Rl | Gl | Rs |
| Bl | Gs | Bs | Gs | Bl | Gs | Bs | Gs |
| Gl | Rs | Gl | Rl | Gl | Rs | Gl | Rl |
| Bs | Gs | Bl | Gs | Bs | Gs | Bl | Gs |
| Gl | Rl | Gl | Rs | Gl | Rl | Gl | Rs |
| Bl | Gs | Bs | Gs | Bl | Gs | Bs | Gs |

[Fig. 9c]
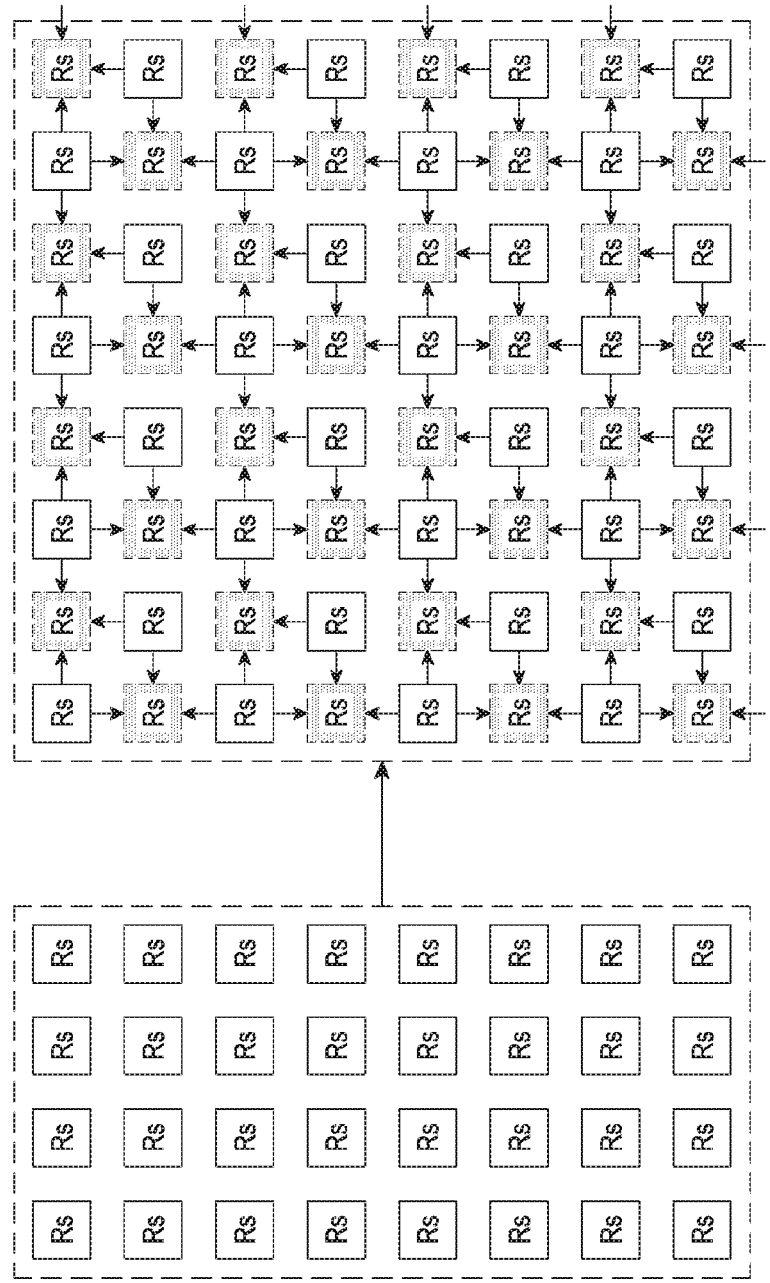
[Fig. 10]
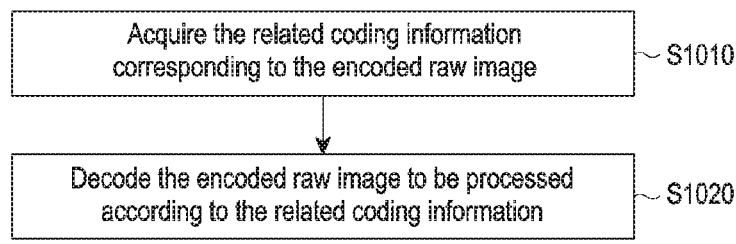

[Fig. 11]
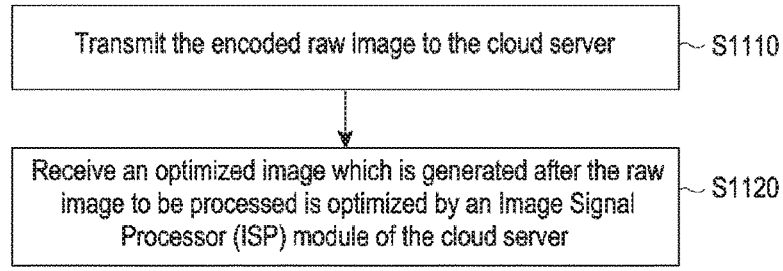
[Fig. 12]
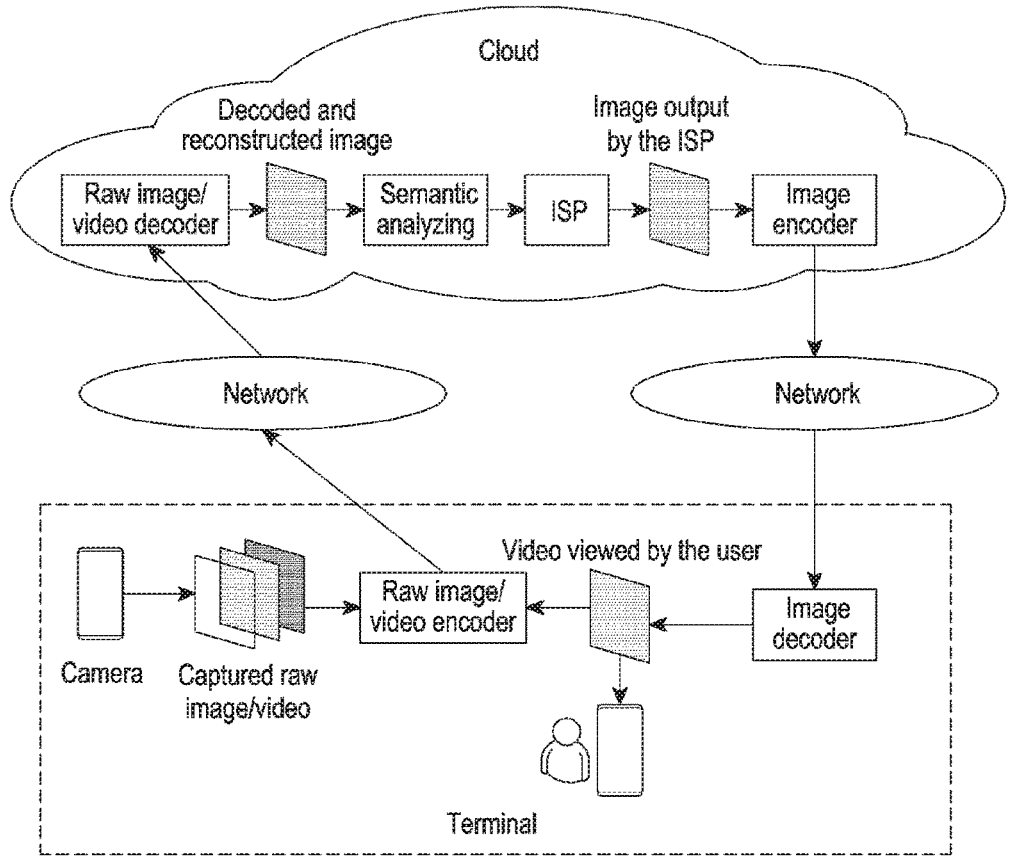
[Fig. 13]
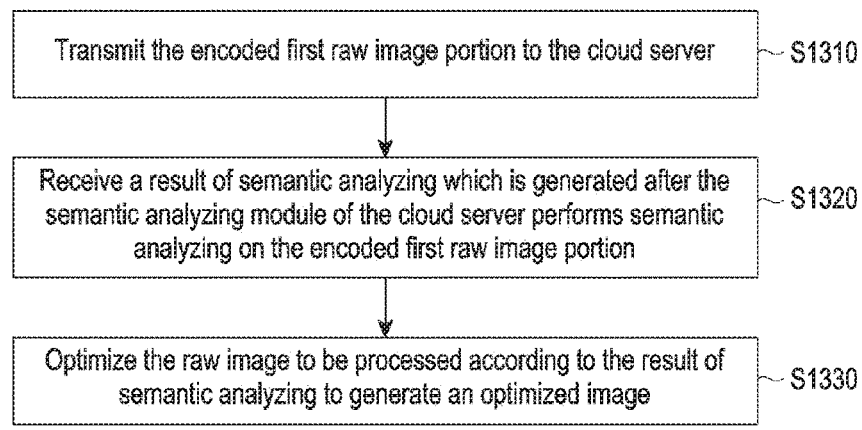

[Fig. 14]
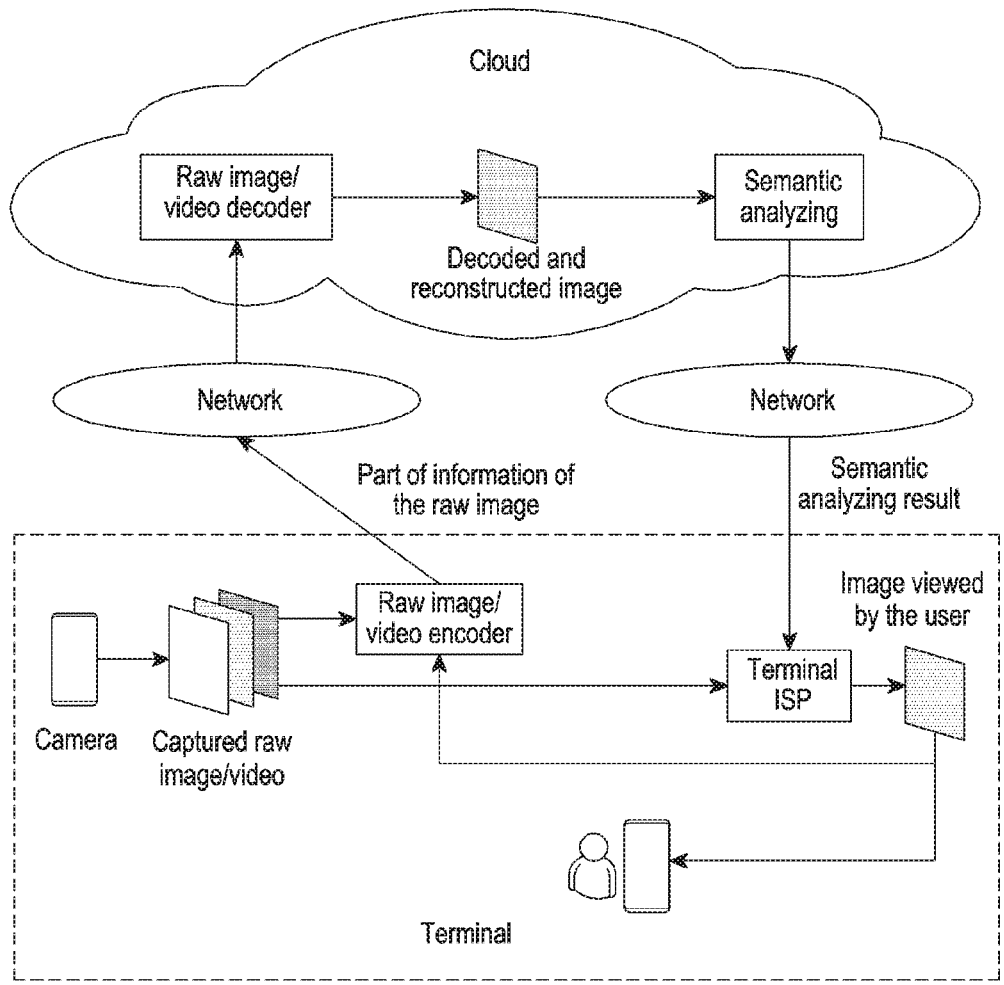
[Fig. 15]
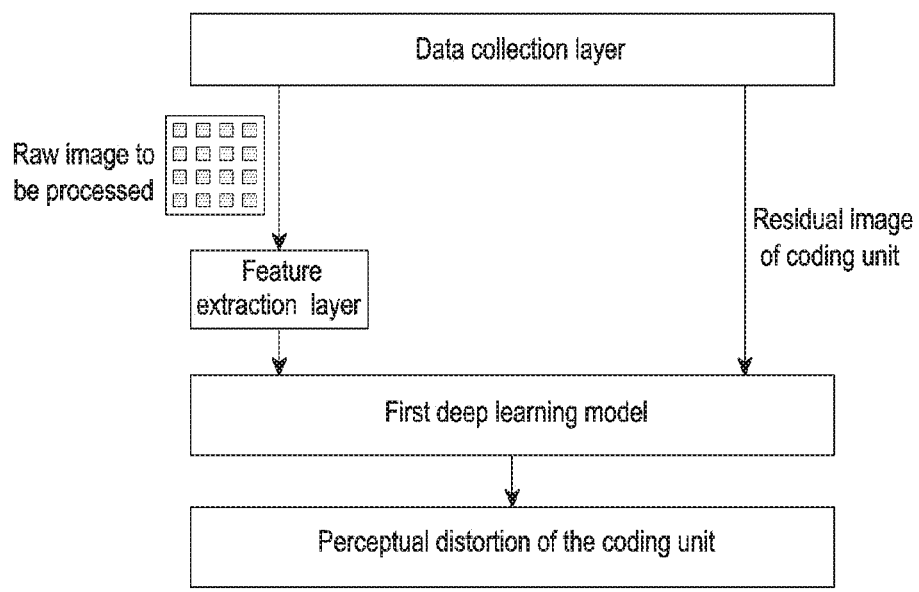

[Fig. 16]
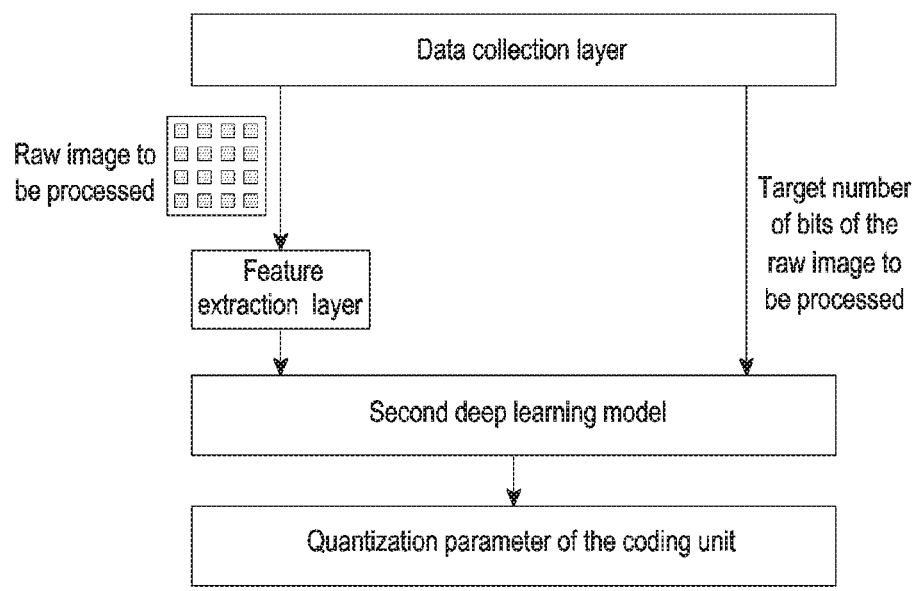

[Fig. 17]
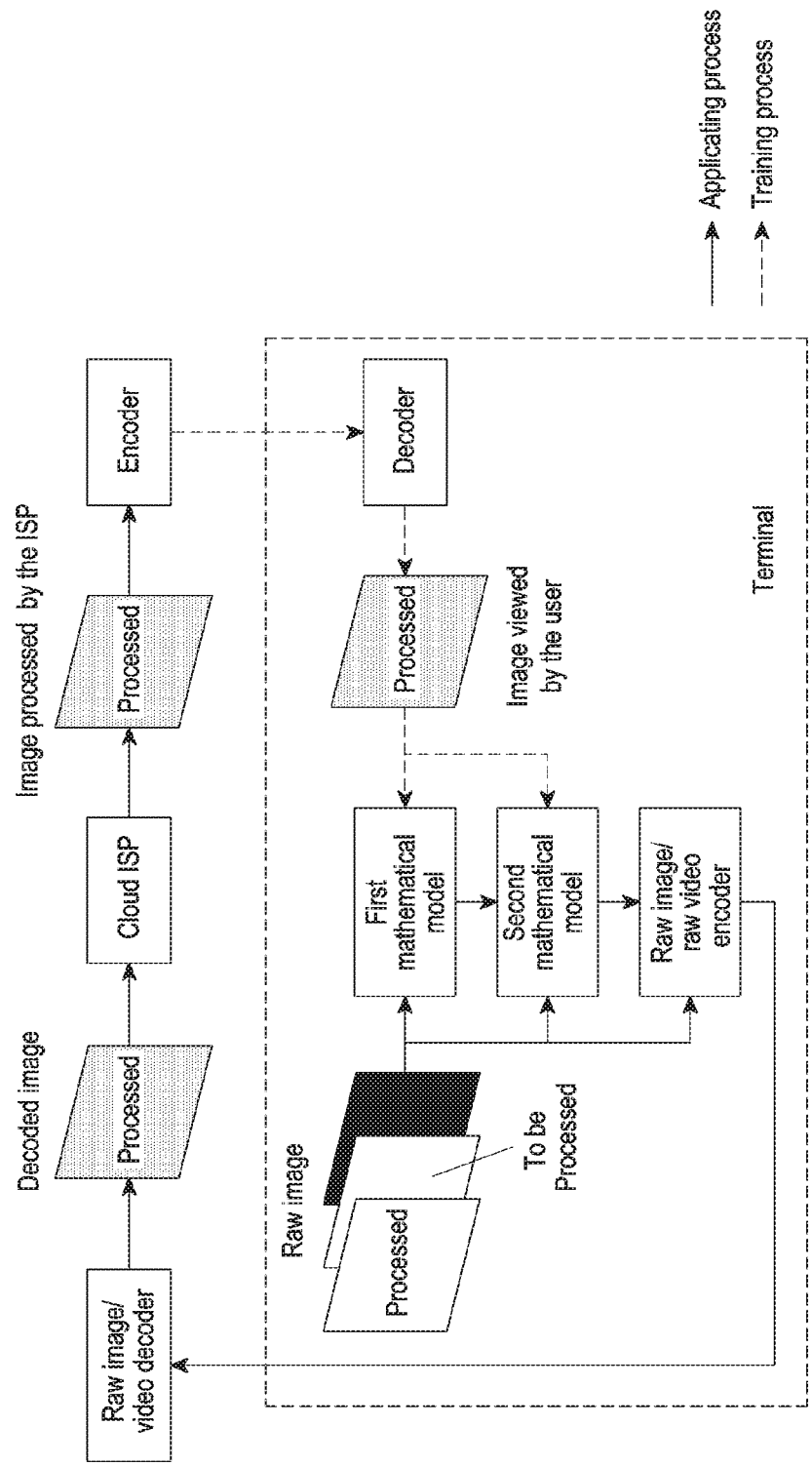

[Fig. 18]
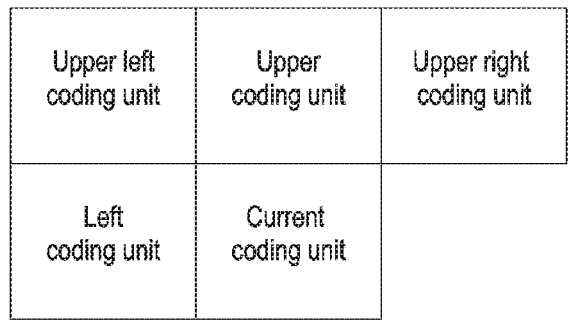
[Fig. 19]
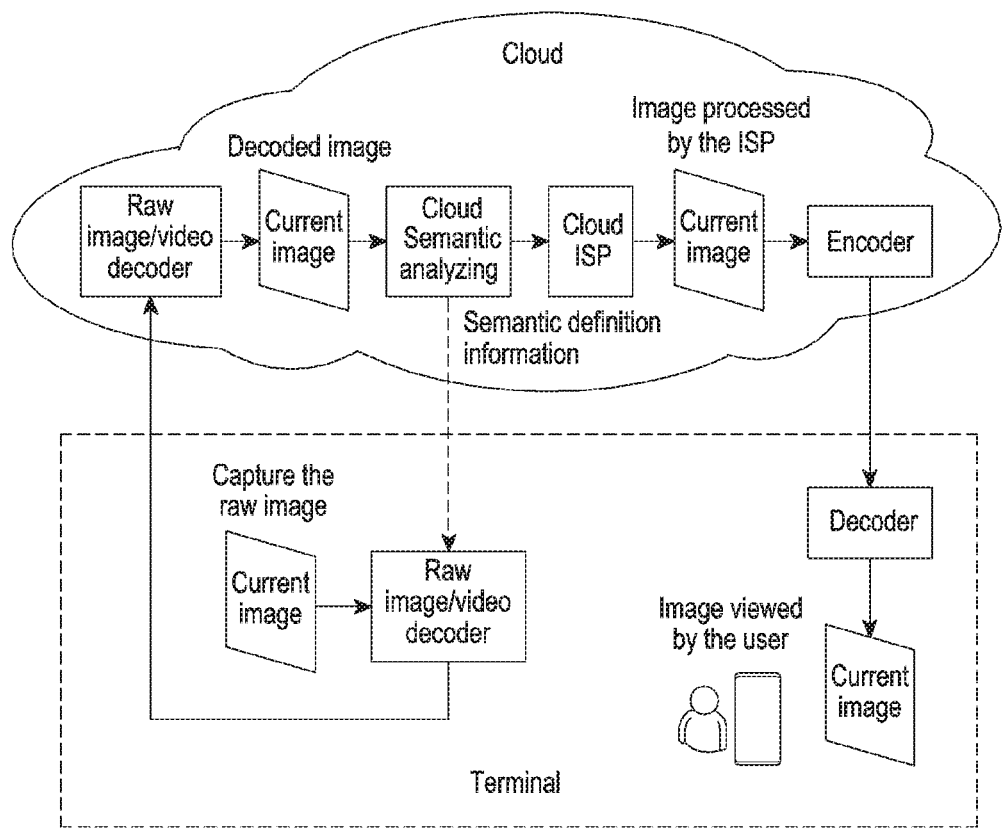

[Fig. 20]
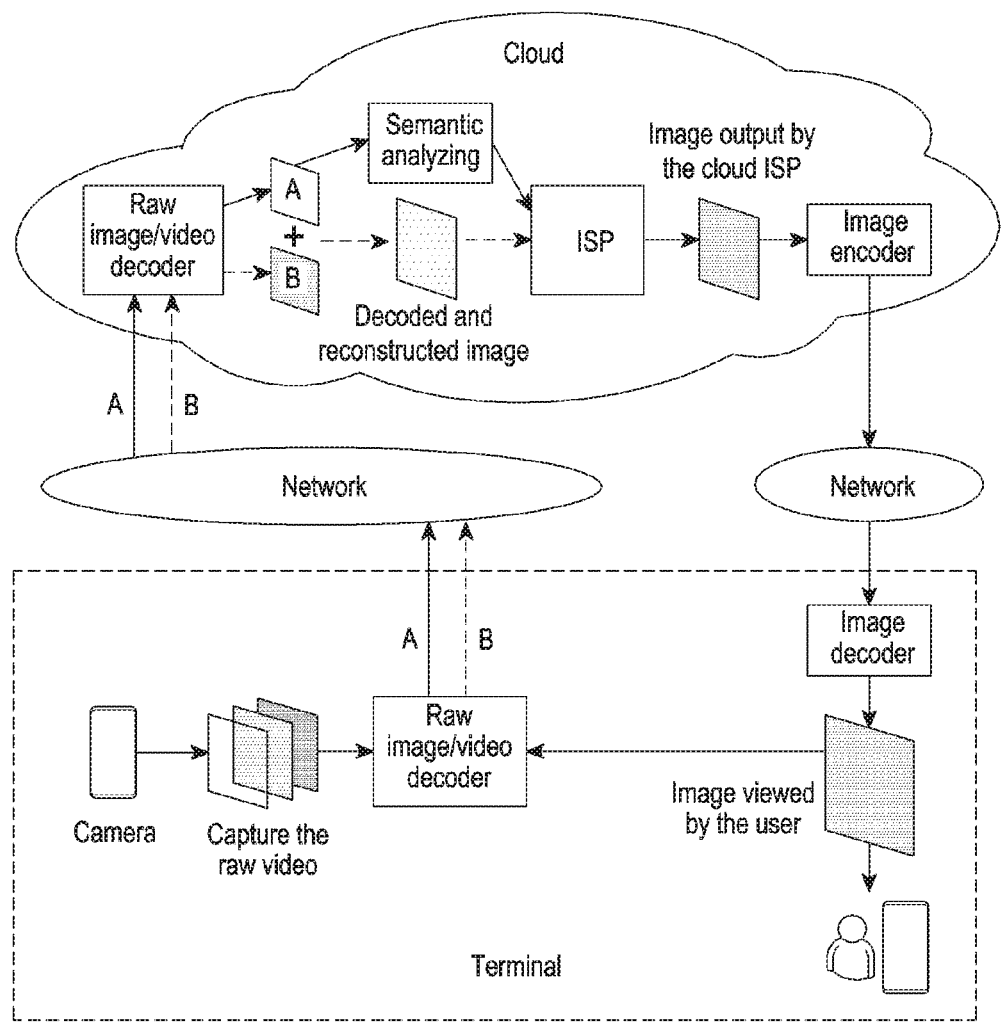

[Fig. 21]
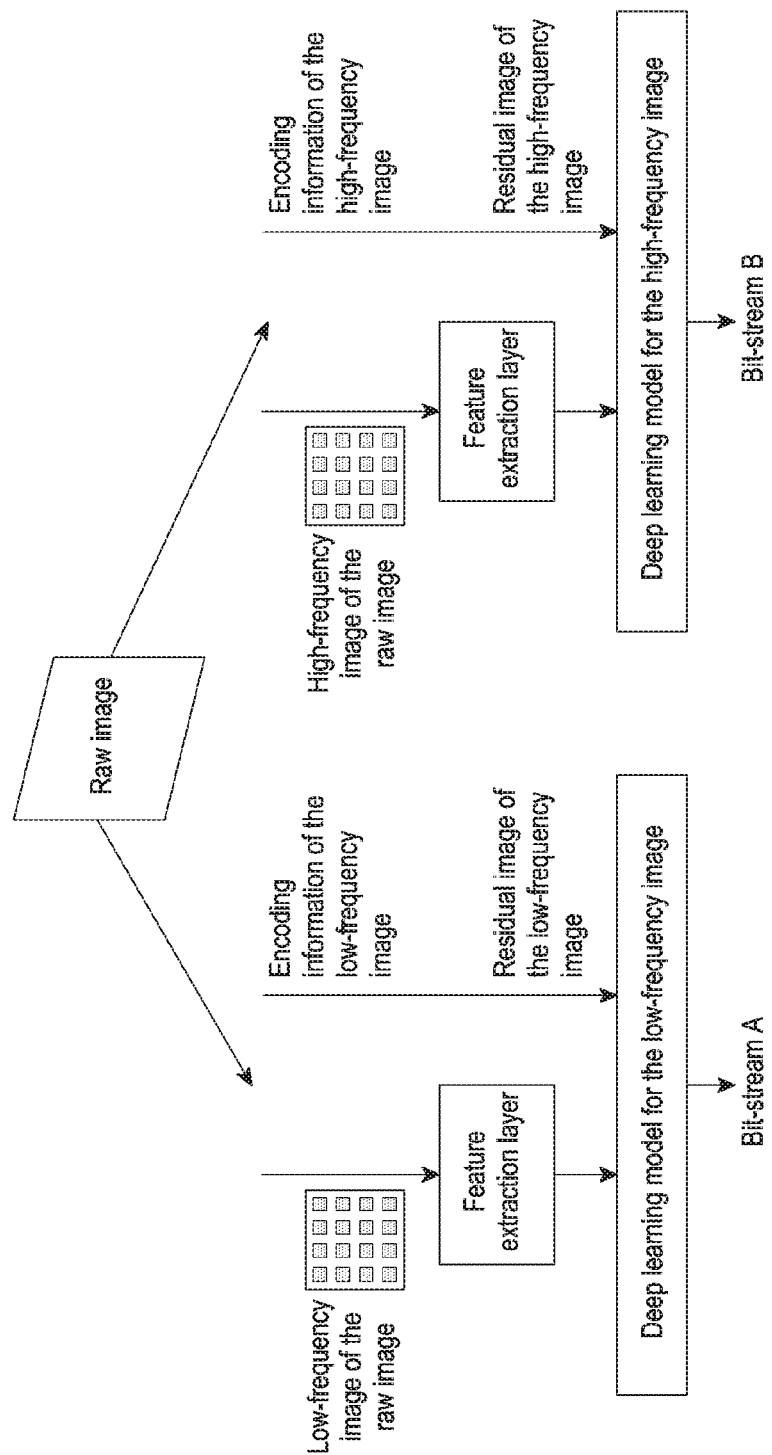

[Fig. 22]
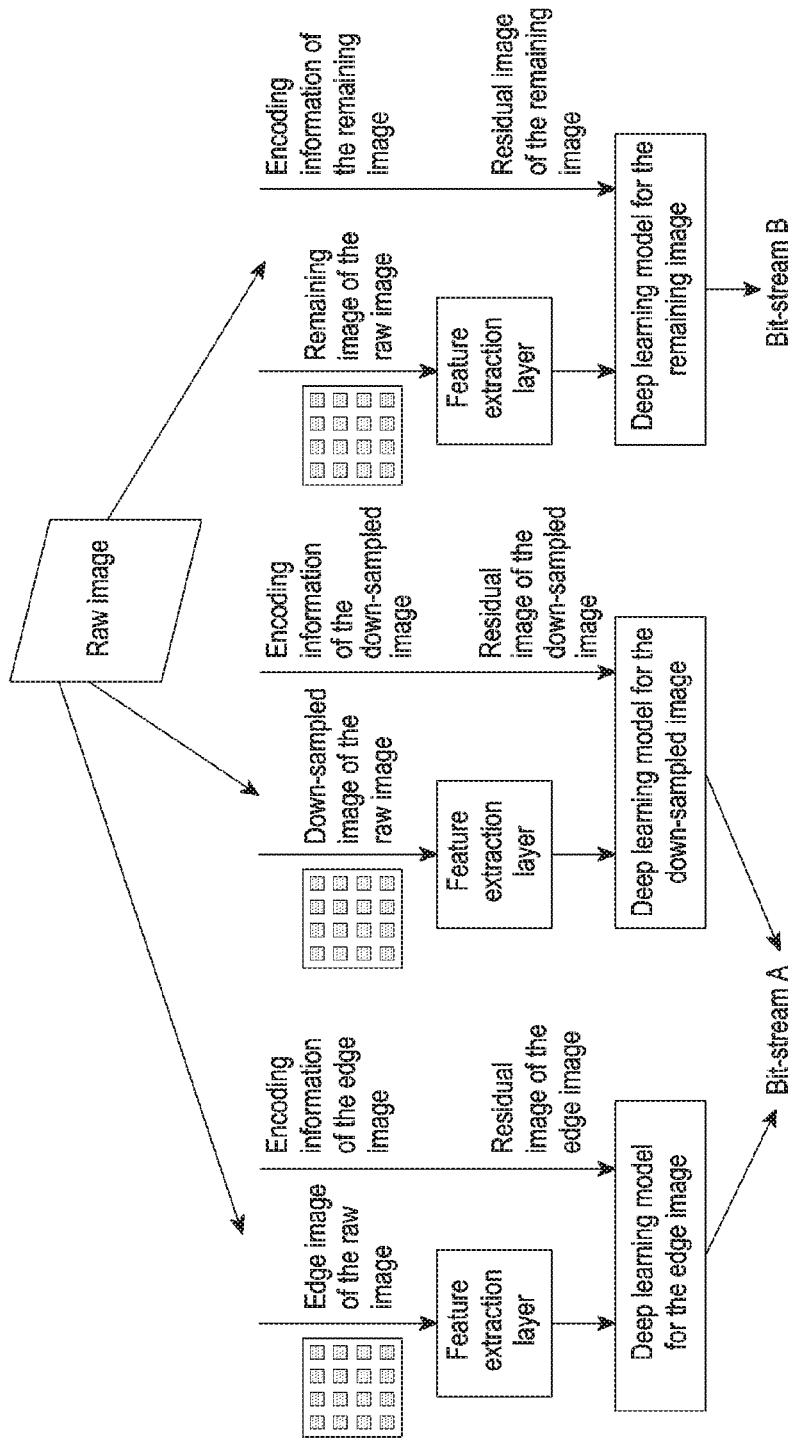

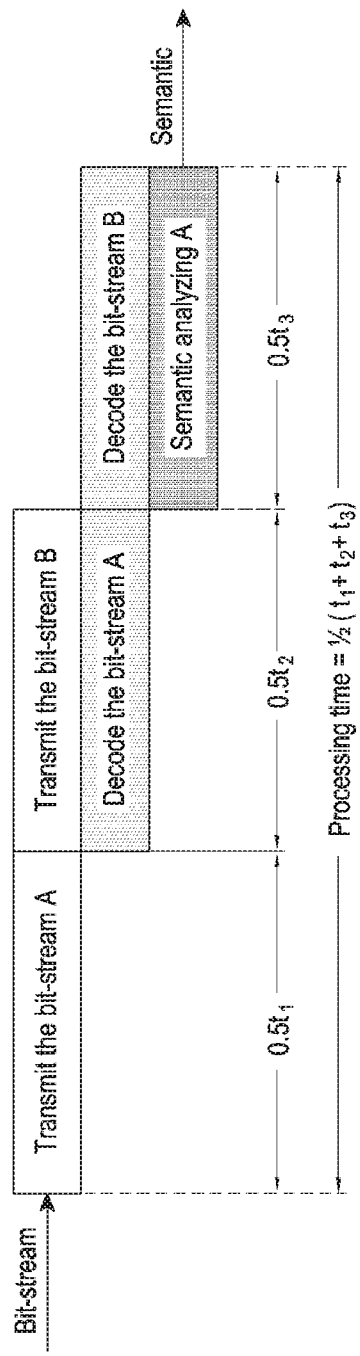
[Fig. 23]

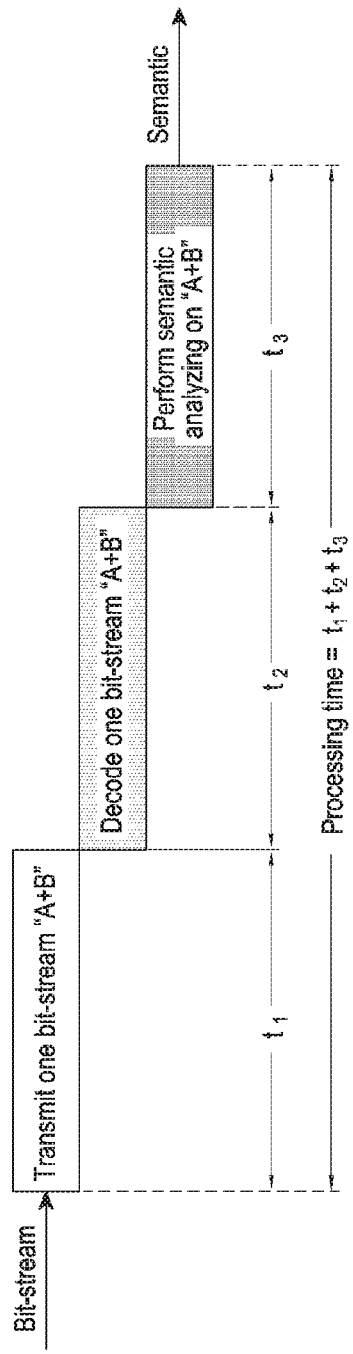
[Fig. 24]

[Fig. 25]
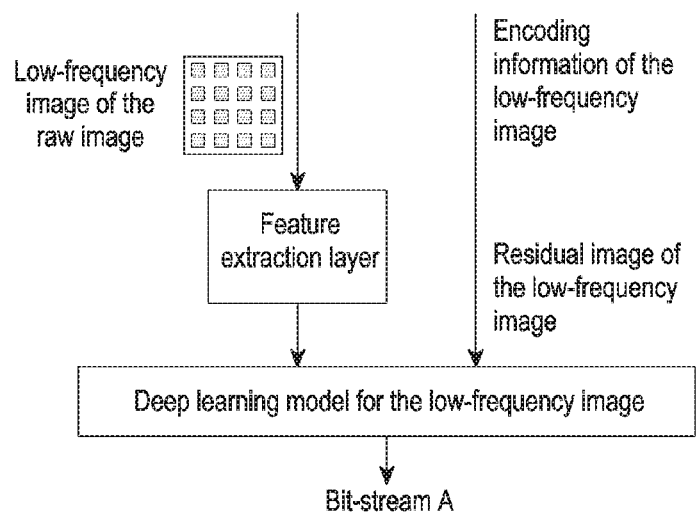
[Fig. 26]
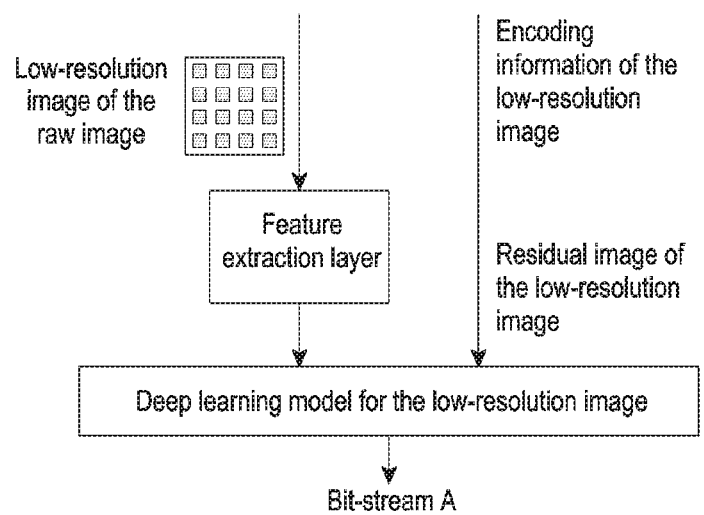

[Fig. 27]
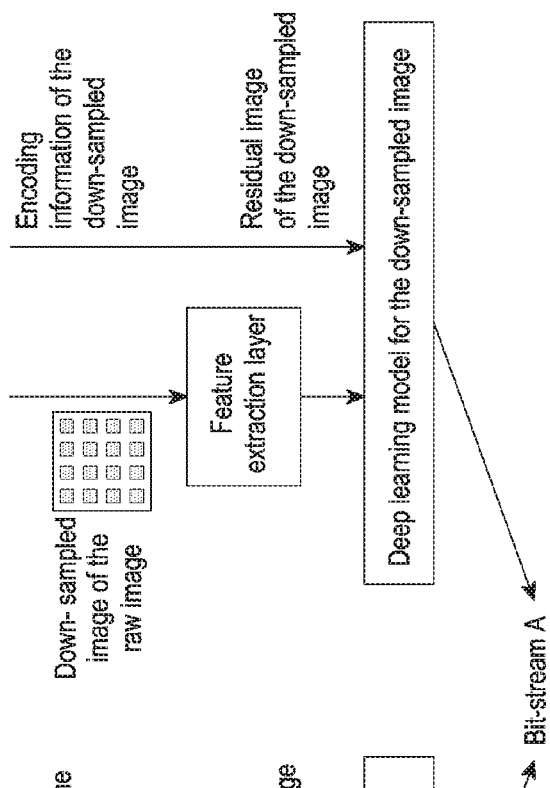
[Fig. 28]
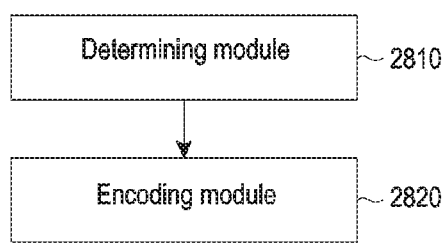

[Fig. 29]
[Fig. 30]
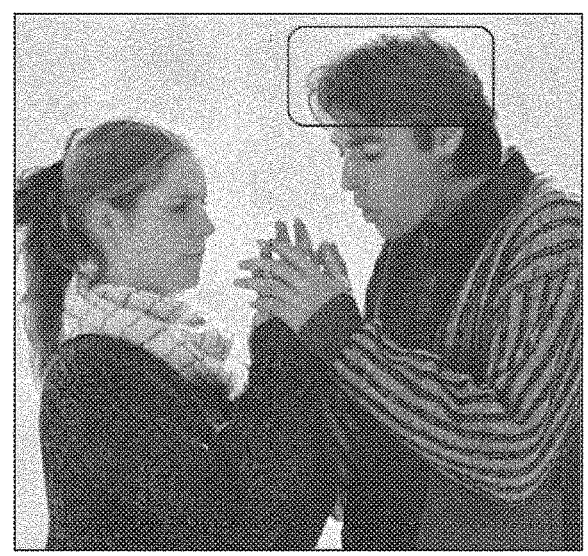
[Fig. 31]
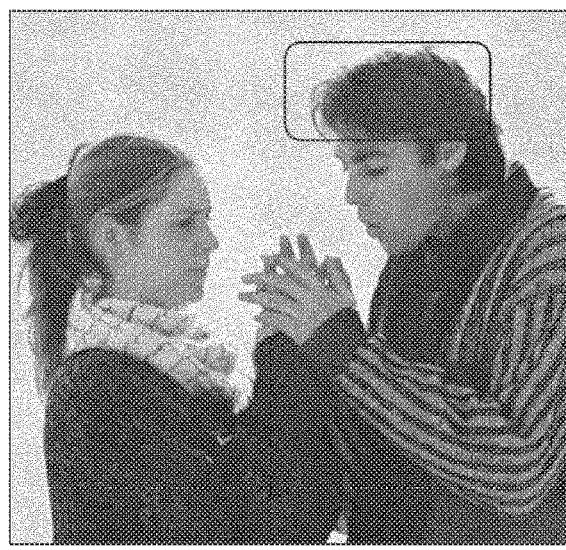

[Fig. 32]
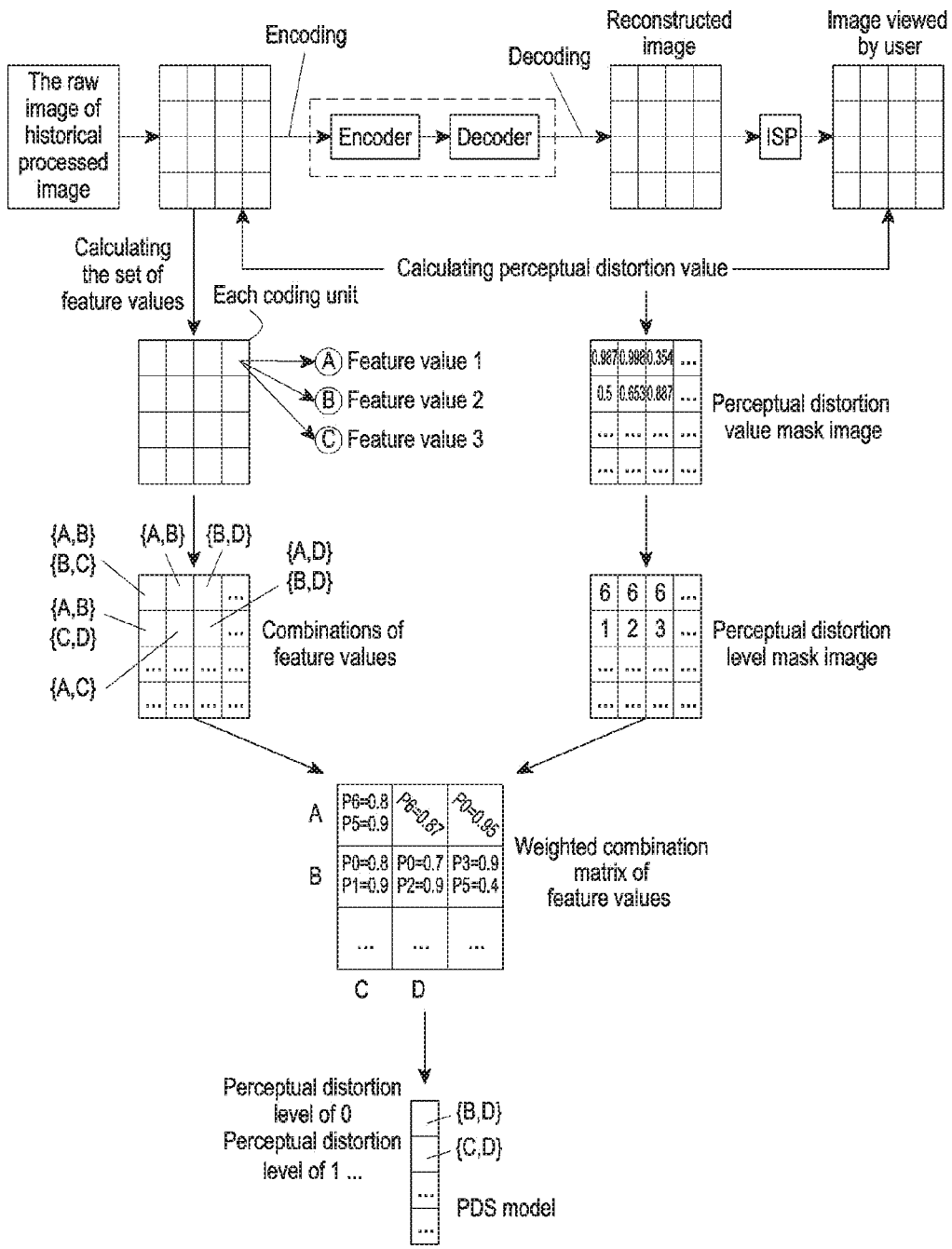

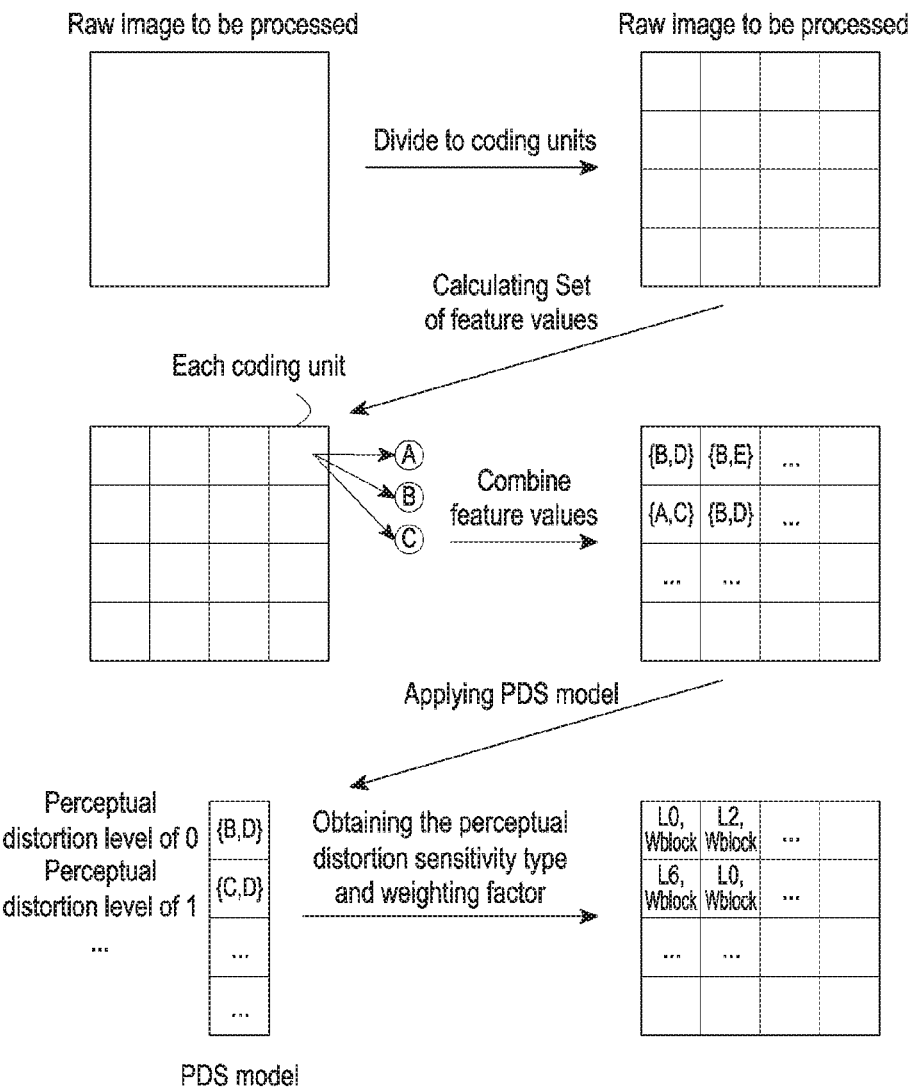
[Fig. 33]
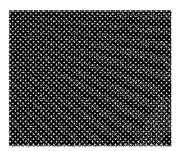
[Fig. 34]
(a)        (b)

METHOD FOR ENCODING IMAGES AND CORRESPONDING TERMINALS

PRIORITY

This application is a National Phase Entry of International Application No. PCT/KR2020/001131 which was filed on Jan. 22, 2020, and claims priority to Chinese Patent Application No. 201910087815.0 filed in the Chinese Intellectual Property Office on Jan. 29, 2019, the content of each of which is incorporated herein by reference.

TECHNICAL FIELD

The present invention relates to the technical field of image processing, and in particular to, a method of encoding an image and corresponding terminals.

BACKGROUND ART

In the existing digital camera system, as shown in FIG. 1, a camera sensor outputs a captured raw image, and then the raw image is optimized by a local Image Signal Processor (ISP) module to improve the quality of the image viewed by a user.

In the existing digital camera system, since the image signal processor module is applied in the terminal side, the raw image does not need to be compressed and transmitted via network. Therefore, there is no related technology of compressing the raw image in the prior art.

An existing image/video codec is capable of processing a general image which is obtained after image processing and format converting of the raw image captured by a camera. Compared with the general image, there are three main differences highlighted as follows.

A. high noise: the energy distribution of signal is different;

B. different attributes and arrangement of color channels:
the general image contains three channels Y, U and V, or R, G and B; and
the raw image contains four channels G1, R, B and G2, the raw image of High-Dynamic Range (HDR) contains six channels G, R, B1, Gs, Rs and Bs, and different camera sensors have different channel order arrangement; and C. different image properties: no signal processing, for example, white balancing, lens collection and dead pixel detection, is performed on the raw image, that is the reason why the properties of the raw image are different from those of the general image.

Considering the abovementioned differences, the encoder tends to use different coding strategies and coding tools to compress a raw image.

DISCLOSURE OF INVENTION

Solution to Problem

To overcome or at least partially solve the technical problems, the following technical solutions are particularly provided.

The present invention provides a method for encoding an image, including the following steps of: determining, according to the feature information of a raw image to be processed, the related coding information corresponding to the raw image to be processed; and encoding, according to the related coding information, the raw image to be processed.

The present invention further provides a terminal, including: a determining module configured to determine, according to the feature information of a raw image to be processed, the related coding information corresponding to the raw image to be processed; and an encoding module configured to encode, according to the related coding information, the raw image to be processed.

The present invention provides a method for encoding an image and the corresponding terminals. The encoded raw image can be transmitted to a cloud server via network, and the decoded and reconstructed raw image is optimized by the ISP module in the cloud server. Compared with the prior art where complex algorithms cannot be implemented by the ISP module in the terminal due to the limitation of its computing capacity, the present invention significantly improves the perceptual quality of the user viewing image by adopting more sophisticated image processing algorithms, while increasing the image compression ratio.

Additional aspects and advantages of the present invention will be partially appreciated and become apparent from the descriptions below, or will be well learned from the practices of the present invention.

BRIEF DESCRIPTION OF DRAWINGS

To describe the technical solutions in the embodiments of the present invention more clearly, the drawings to be used in the embodiments will be briefly described below. It should be understood that, the following drawings just show some of the embodiments of the present invention and thus they should not be considered as any limitation to the scope, and a person of ordinary skill in the art may also obtain other related drawings according to these drawings without paying any creative effort.

FIG. 1 is a schematic diagram of a process of image signal processing of a digital camera system;

FIG. 2 is a schematic diagram of a "cloud camera" system based on a cloud camera-cloud ISP architecture according to embodiments of the present invention;

FIG. 3 is a schematic diagram of a "cloud camera" system based on a cloud camera-cloud semantic analyzing architecture according to embodiments of the present invention;

FIG. 4a is a schematic diagram of an existing image decoder and encoder;

FIG. 4b is a schematic diagram of a raw image decoder and encoder according to embodiments of the present invention;

FIG. 5 is a schematic flowchart of a method for encoding an image according to embodiments of the present invention;

FIG. 6 is a schematic diagram of the hierarchical structure of a deep learning network according to embodiments of the present invention;

FIG. 7 is a schematic diagram of acquiring a set of feature values according to embodiments of the present invention;

FIG. 8 is a schematic flowchart of training a first model and a second model according to embodiments of the present invention;

FIG. 9a is a schematic diagram of a four-channel image format of a raw image according to embodiments of the present invention;

FIG. 9b is a schematic diagram of a six-channel image format of a raw image according to embodiments of the present invention;

FIG. 9c is a schematic diagram of extracting a kind of feature values according to embodiments of the present invention;

FIG. 10 is a schematic flowchart of a decoding method according to embodiments of the present invention;

FIG. 11 is a schematic flowchart of an image processing method according to embodiments of the present invention;

FIG. 12 is a schematic flowchart of an image processing method in the "cloud camera" system based on the cloud camera-cloud ISP architecture according to embodiments of the present invention;

FIG. 13 is a schematic flowchart of another image processing method according to embodiments of the present invention;

FIG. 14 is a schematic flowchart of an image processing method in the "cloud camera" system based on a cloud camera-cloud semantic analyzing architecture according to embodiments of the present invention;

FIG. 15 is a schematic flowchart of applying a first deep learning model according to Embodiment 1 of the present invention;

FIG. 16 is a schematic flowchart of applying a second deep learning model according to Embodiment 1 of the present invention;

FIG. 17 is a schematic flowchart of a processing method related to a mathematical model method in the "cloud camera" system based on the cloud camera-cloud ISP architecture according to Embodiment 2 of the present invention;

FIG. 18 is a schematic diagram of adjacent coding units according to Embodiment 2 of the present invention;

FIG. 19 is a schematic diagram of a "cloud camera" system based on a cloud camera-cloud ISP architecture in combination with cloud semantic analyzing according to Embodiment 3 of the present invention;

FIG. 20 is a schematic diagram of multi-bit-stream transmission in the "cloud camera" system based on the cloud camera-cloud ISP architecture according to Embodiment 4 of the present invention;

FIG. 21 is a schematic diagram of a method for dividing a raw image according to Embodiment 4 of the present invention;

FIG. 22 is a schematic diagram of another method for dividing a raw image according to Embodiment 4 of the present invention;

FIG. 23 is a schematic diagram of processing time according to Embodiment 4 of the present invention;

FIG. 24 is a schematic diagram of processing time according to Embodiments 1, 2 and 3 of the present invention;

FIG. 25 is a schematic diagram of a first method for dividing a raw image according to Embodiment 5 of the present invention;

FIG. 26 is a schematic diagram of a second method for dividing a raw image according to Embodiment 5 of the present invention;

FIG. 27 is a schematic diagram of a third method for dividing a raw image according to Embodiment 5 of the present invention;

FIG. 28 is a schematic block diagram of a terminal according to Embodiment 6 of the present invention;

FIG. 29 is an example of an image processed by an existing terminal ISP module;

FIG. 30 is an example of an image which is processed by the encoding method according to Embodiment 2 of the present invention and then processed by the ISP module;

FIG. 31 is an example of an image processed by an existing compression method;

FIG. 32 is an example of a process of offline training the PDS model according to Embodiment 2 of the present invention;

FIG. 33 is an example of applying PDS model according to Embodiment 2 of the present invention;

FIG. 34 is an example of a weighted combination matrix of feature values in a step of offline training PDS model according to Embodiment 2 of the present invention.

MODE FOR THE INVENTION

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the present invention belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

Considering that complex algorithms cannot be implemented by an ISP module in a terminal, the capacity of image optimization technologies cannot get the best. In a "cloud camera" system according to the embodiments of the present invention, a time-consuming and complex image processing module is arranged in a cloud server.

The "cloud camera" system according to the embodiments of the present invention includes two architecture schemes.

1) Cloud Camera-Cloud ISP

A terminal ISP is replaced by a cloud ISP, so that the cloud ISP module can significantly improve the quality of the processed raw image, since more sophisticated image processing algorithms can be implemented. As shown in FIG. 2, the terminal compresses a raw image to be processed and transmits it to the cloud, and the cloud ISP module optimizes the decoded raw image to generate an image viewed by a user and transmits the image to the terminal.

2) Cloud Camera-Cloud Semantic Analyzing

A powerful cloud semantic analyzing module completes semantic analyzing of the raw image based on the large database and complex algorithms, and transmits the result of semantic analyzing to the terminal ISP module to help it achieving better image optimization performance. As shown in FIG. 3, the terminal compresses a raw image to be processed and transmits it to the cloud, and the cloud semantic analyzing module performs semantic analyzing on the decoded raw image and transmits the result of semantic analyzing to the terminal. The terminal ISP module optimizes the raw image to be processed according to the result of semantic analyzing to generate an image viewed by a user.

It can be seen that, due to the limitation of the bandwidth of wireless network, the terminals in both of these architectures need to encode the raw image to be processed to generate a compressed bit-stream for transmission. After receiving the compressed bit-stream, the cloud server decodes it and performs corresponding processing on the decoded and reconstructed raw image.

Therefore, the encoding and decoding process of the raw image is crucial in the application of the "cloud camera" system. However, the existing image codec cannot be directly applied to the "cloud camera" system of the present invention. Because the existing image encoder is used in the network transmission system where no subsequent image processing operation will be conducted, and the purpose is to reduce the coding artifacts and maintain the objective quality of the image under the limited bandwidth. Therefore, as shown in FIG. 4a, the existing image encoder just needs to compress a general image to a bit-stream and transmit it to another terminal via network. The existing image decoder in another terminal decodes the bit-stream to get the decoded general image.

However, in the scenario of cloud camera system, after processed by the encoder and decoder, the raw image will be optimized by the cloud semantic analyzing module and the cloud ISP module in server, thus the purpose of this invention is to reduce the perceptual distortion introduced by all of the image processing processes and guarantee a high perceptual quality of the user viewing image under the limited bandwidth. Therefore, as shown in FIG. 4b, the image encoder in the "cloud camera" system encodes a raw image to generate a compressed bit-stream which is transmitted to the cloud via network. The image decoder in the "cloud camera" system decodes the compressed bit-stream to obtain the reconstructed raw image, and then the cloud ISP or the cloud semantic analyzing module performs corresponding processes on the decoded raw image to obtain an image viewed by the user.

In the embodiments of the present invention, to solve the problem that the "cloud camera" system cannot use the existing image encoder and decoder, the embodiments of the present invention provide a "raw image encoder and decoder". In addition to the implementation of encoding and decoding of the raw images and raw videos, the perceptual quality of images and videos processed by the "cloud camera" system is improved.

Methods for encoding, decoding and processing an image in the "cloud camera" system according to the embodiments of the present invention will be described below in detail.

The embodiments of the present invention provide a method for encoding an image, as shown in FIG. 5, including the following steps.

Step S510: According to the feature information of a raw image to be processed, the related coding information corresponding to the raw image to be processed is determined.

Particularly, the related perceptual distortion information corresponding to the raw image to be processed is determined according to the feature information of the raw image to be processed, and the purpose is to optimize the perceptual quality of the image.

Preferably, the related coding information includes the related perceptual distortion information and the encoding parameters. In the step, the related perceptual distortion information and the encoding parameters corresponding to the raw image to be processed are determined according to the feature information of the raw image to be processed.

In the embodiments of the present invention, the related perceptual distortion information corresponding to the raw image to be processed is determined according to the feature information of the raw image to be processed and based on a trained first model.

The encoding parameters of the raw image are determined according to the feature information of the raw image to be processed and based on a trained second model.

Wherein, the encoding parameters include the quantization parameters or other parameters. In the practical application, the first model and the second model are deep learning network models, for example, multilayer convolutional neural network. Particularly, the first model includes a first deep learning model and the second model includes a second deep learning model.

Or, the first model and the second model are established mathematical models. Particularly, the first model includes a first mathematical model and the second model includes a second mathematical model.

As shown in FIG. 6, the deep learning network involved in the embodiments of the present invention contains the following hierarchical structures, including:

1) a data collection layer configured to acquire data such as the raw image, the processed image, the encoding parameters, the number of bits used for encoding, and the residual image;

2) a feature extraction layer configured to extract feature values of each coding unit in the raw image and output a set of feature values of each coding unit, as shown in FIG. 7;

3) a training data layer in which the training data is a set of feature values of each coding unit in the processed raw image, wherein when a model is trained in real time, the processed raw image is a processed raw image previous to the raw image to be processed, and if necessary, several previous processed raw images are used, as shown in FIG. 8; and when a model is trained off-line, the processed raw image is a historical processed image, for example, an existing historical processed raw image in existing database:

4) a perceptual distortion evaluation layer in which the raw image and an image obtained after the raw image is processed by the ISP are the inputs, and related perceptual distortion information of each coding unit is the output; and 5) a multilayer convolutional neural network layer:

training process: data or information obtained in the above hierarchies is the input for training to obtain the first deep learning model or the second deep learning model; and application process: data or information obtained in the above hierarchies is the input to the trained deep learning model and the related coding information is the output.

Mathematical models involved in the embodiments of the present invention include:

a model based on the relationship between "feature value set-perceptual differences": a relation between the set of feature values of each coding unit in the raw image and perceptual differences is described and a weighting factor of each coding unit for calculating a target number of bits of each coding unit is the output; and a model based on the relationship among "the number of bits-feature value set-quantization parameter": the set of feature values of each coding unit in the raw image and the target number of bits are the inputs and the encoding parameters of each coding unit are the outputs, for example, the quantization parameter.

In the embodiments of the present invention, one format of the raw image to be processed is as shown in FIG. 9a, including four color channels. Pixels may be arranged in order of G1, R, B and G2 or may be in other ways. Another format of the raw image to be processed is as shown in FIG. 9b, including six color channels G1, R1, B, Gs, Rs and Bs. Its principle is similar to that of the format including four color channels and will not be repeated here.

Optionally, the feature value set includes at least one of the following parameters: brightness; smoothness; edge strength; edge directional consistency; and texture complexity. Particularly, they are obtained in the following ways.

1) For the raw image of the four-channel format shown in FIG. 9a

The average of brightness: Averages of all pixel values in four single-color channels of the coding unit are first calculated, and then a weighted average of the averages of the four single-color channels is calculated according to a proportion of G1:R:G2:B=9:10:9:4. Optionally, the proportion may be other values according to different standards of camera sensor apparatuses.

The magnitude of directional gradient: A magnitude of directional gradient of each pixel in the coding unit is first calculated by a Sobel operator, and then a weighted average of the magnitudes of directional gradient of all pixels is calculated according to a proportion of G1:R:G2:B=2:1:2:1. Optionally, the proportion may be other values according to different standards of sensor apparatuses. Optionally, the Sobel operator may be replaced with a Prewitt operator, a Lapacian operator, etc.

The consistency of textural direction: A G1 color channel of the coding unit is first divided into four equally-sized subunits, an average of the magnitudes of directional gradient of all pixels in each subunit is calculated, and then a variance of the averages of the magnitudes of the directional gradient of four subunits is calculated.

The presence or absence of wide stripes in the coding unit: The coding unit is first divided into four equally-sized subunits, the number of pixels having a magnitude of directional gradient greater than a threshold in each subunit is calculated, and then it is judged whether the number of that pixels in all of the four subunits are greater than the threshold.

Optionally, the set of feature values may also contain other feature values.

2) For the raw image of the six-channel format shown in FIG. 9b

The average of brightness: Averages of all pixel values in two color channels G1 and Gs in the coding unit are calculated.

The magnitude of directional gradient: A magnitude of directional gradient of each pixel in color channels G1 and Gs of the coding unit are first calculated by a Sobel operator, and then a weighted average of the magnitudes of directional gradient of all pixels in the two color channels G1 and Gs is calculated. Optionally, the Sobel operator may be replaced with a Prewitt operator, a Lapacian operator, etc.

The consistency of textural direction: The color channels G1 and Gs of the coding unit are first divided into four equally-sized subunits, respectively. An average of the magnitudes of directional gradient of all pixels in each subunit is calculated, and then a variance of the averages of the magnitudes of directional gradient of four subunits is calculated.

The presence or absence of wide stripes in the coding unit: The color channels G and Gs of the coding unit are first divided into four equally-sized subunits, respectively, the number of pixels having a magnitude of directional gradient greater than a threshold in each subunit is calculated, and then it is judged whether the number of that pixels in all of the four subunits are greater than the threshold.

Optionally, the set of feature values and obtaining processes thereof may also include:

The average of brightness: Averages of all pixel values in six single-color channels of the coding unit are first calculated, and then a weighted average of the averages of the six single-color channels is calculated according to a proportion of Gs:Rs:Bs=G1:R1:B1=9:5:2. Optionally, the proportion may be other values according to different standards of sensor apparatuses.

The magnitude of directional gradient: Four color channels sub-blocks Rs, Bs, R1 and B1 are transformed into sub-blocks with a size equal to G1 and Gs, respectively. The specific method is as follows: taking Rs as example, as shown in FIG. 9c, a pixel value of a gray position is obtained by an average of pixel values of three real white positions adjacent to the gray position; a magnitude of directional gradient of each pixel in each color channel sub-block in the coding unit is calculated by a Sobel operator, and then a weighted average of the magnitudes of directional gradient of all pixels is calculated according to a proportion of Gs:Rs:Bs=G1:R1:B1=2:1:1. Optionally, the proportion may be other values according to different standards of sensor apparatuses. Optionally, the Sobel operator may be replaced with a Prewitt operator, a Lapacian operator, etc.

The consistency of textural direction: The color channels G1 and Gs of the coding unit are first divided into four equally-sized subunits, respectively. An average of the magnitudes of directional gradient of all pixels in each subunit is calculated, and then a variance of the averages of the magnitudes of directional gradient of four subunits is calculated.

The presence or absence of wide stripes in the coding unit: The color channels G and Gs of the coding unit are first divided into four equally-sized subunits, respectively. The number of pixels having a magnitude of directional gradient greater than a threshold in each subunit is calculated, and then it is judged whether the number of that pixels in all the four subunits are greater than the threshold.

Optionally, the set of feature values may also contain other feature values.

After the encoding parameter of the raw image is determined by the method, a step S520 may be executed.

Step S520: The raw image to be processed is encoded according to the related coding information.

Particularly, the raw image to be processed is encoded according to the related perceptual distortion information, and the purpose is to optimize the perceptual quality of the image.

Therefore, in the embodiments of the present invention, in the encoding process, according to the related perceptual distortion information, the allocated number of bits are proportional to the perceptual distortion sensitivity of the coding unit. That is, in the embodiments of the present invention, a larger number of bits are allocated to perceptual distortion sensitive areas (i.e. areas where perceptual distortion highly perceptible to human eyes) and a fewer number of bits are allocated to insensitive areas (i.e. areas where distortion is less perceptible to human eyes) to achieve this purpose in the encoding process.

Preferably, the related coding information includes the related perceptual distortion information and the encoding parameters. In the step, the raw image to be processed is encoded according to the related perceptual distortion information and the encoding parameters and according to a predetermined encoding order.

In the practical application, it is needed to determine an optimal prediction mode for each coding unit in the raw image to be processed. For a deep learning way involved in the embodiments of the present invention, the optimal prediction mode for each coding unit is determined according to a perceptual distortion value of each coding unit in the raw image to be processed.

For a mathematical model way involved in the embodiments of the present invention, in the image encoding process, based on the correlation of the image in space and/or time, by using encoded pixels adjacent in space and/or time as reference pixels, the encoder selects an optimal prediction mode from multiple candidate prediction modes to achieve the purpose of compressing image data, saving the transmission bandwidth and ensuring the image quality.

Then, the raw image to be processed is encoded according to the optimal prediction mode and the encoding parameter of each coding unit in the raw image to be processed.

In the prediction process, the candidate prediction mode with the lowest rate-distortion cost is finally selected as the optimal mode for the current coding unit to be encoded. The lowest rate-distortion cost indicates that the best tradeoff between distortion and the number of consumed bits may be realized by the prediction mode.

Taking the raw image in the format of four color channels shown in FIG. 9a for example, pixels are arranged in order of G1, R, B and G2, and the width and height of the raw image to be compressed are defined as W_Image and H_Image. Before the raw image is processed, the four color channels are separated to obtain four images with a single-color channel, and the width and height of each raw image with a single-color channel are W_Image/2 and H_Image/2, respectively.

Prediction process is performed on each of the four channels G1, R, B and G2 based on the related perceptual distortion information to obtain their own optimal prediction modes, respectively. Meanwhile, besides the typical prediction modes, for example, R, B and G2, channels use G1 channel as reference pixels to cross component predicting their prediction values, respectively. And then the optimal prediction mode with the minimum rate-distortion cost is chose.

Similarly, prediction is performed on the six channels G1, R1, B, Gs, Rs and Bs shown in FIG. 9b by the related perceptual distortion information to obtain their own optimal prediction modes, respectively. Besides the typical prediction modes, R1 and B1 use G1 as the reference pixels to cross component predicting their prediction values, and Rs and Bs use Gs as the reference pixels to cross component predicting their prediction values. And then the optimal prediction mode with the minimum rate-distortion cost is chose respectively.

After the optimal prediction mode for each coding unit in the raw image to be processed is determined, a residual value corresponding to each coding unit in the raw image is determined according to the encoding parameters of each coding unit and based on the optimal prediction mode thereof.

By using the determined encoding parameters, taking the quantization parameter for example, a value obtained after an actual difference of each color channel of each coding unit is transformed and quantized to obtain the residual value.

Then, entropy encoding is performed on the residual value to generate a compressed bit-stream.

Accordingly, the embodiments of the present invention provide a decoding method which is executed by the image decoder in the cloud, as shown in FIG. 10, including the following steps.

Step S1010: Acquiring of the related coding information corresponding to the encoded raw image.

Particularly, information such as a quantization parameter, an optimal prediction mode and a residual value related to the encoded raw image is acquired from the received compressed bit-stream.

Step S1020: Decoding of the encoded raw image to be processed according to the related coding information.

Inverse quantization and inverse transformation are performed on the residual value of each color channel by the quantization parameter. The prediction value of each color channel of the encoded raw image is obtained based on the optimal prediction mode for each color channel. The corresponding prediction value is added to the difference value obtained by inverse quantization and inverse transformation performed on the residual value to obtain a reconstructed value of the encoded raw image. The encoded raw image is decoded and reconstructed. By doing these, the cloud ISP module or semantic analyzing module can perform corresponding processes on the decoded raw image. Better optimizing performance can be realized and the perceptual quality of the user viewing image can be significantly improved, while increasing the image compression ratio.

Optionally, in the embodiments of the present invention, the whole process of processing a raw image by a terminal further includes the following steps, as shown in FIG. 11.

Step S1110: An encoded raw image is sent to the cloud server.

Step S1120: Receive the optimized image which is generated after the raw image to be processed is optimized by an Image Signal Processor (ISP) module of the cloud server.

Obviously, the image processing method is an operation which is executed by a "cloud camera" system based on the cloud camera-cloud ISP architecture scheme. In fact, as shown in FIG. 12, the whole processing process of the architecture scheme includes the following steps.

Step 1: The terminal acquires a raw image to be processed, for example, a raw image captured in real time or a received raw image, which is not limited in the embodiments of the present invention.

Step 2: The terminal derives the related coding information corresponding to the raw image.

Step 3: The terminal compresses the raw image according to the related coding information and transmits the compressed bit-stream of the raw image to the cloud.

Step 4: The cloud server decompresses the received compressed bit-stream to obtain the reconstructed raw image.

Step 5: The cloud ISP module optimizes the reconstructed raw image.

Step 6: The cloud transmits the optimized image to the terminal.

Optionally, in the embodiments of the present invention, the whole process of processing a raw image by a terminal further includes the following steps, as shown in FIG. 13.

Step S1310: An encoded first raw image portion is sent to a cloud server.

Step S1320: A result of semantic analyzing, which is generated after the semantic analyzing module of the cloud server performs semantic analyzing on the encoded first raw image portion, is received.

Step S1330: The raw image to be processed is optimized according to the result of semantic analyzing to generate an optimized image.

Wherein, the first raw image portion includes any one of the following situations: a low-frequency image portion of the raw image to be processed; a low-resolution image portion of the raw image to be processed; and an edge information image portion and a down-sampled image portion of the raw image to be processed.

Obviously, the image processing method is operations which are executed by a "cloud camera" system based on the cloud camera-cloud semantic analyzing architecture scheme. In fact, as shown in FIG. 14, the whole processing process of the framework scheme includes the following steps.

Step 1: The terminal acquires a raw image to be processed, for example, a raw image captured in real time or a received raw image, which is not limited in the embodiments of the present invention.

Step 2: The terminal derives the related coding information corresponding to the raw image or the related coding information which is based on a partial of the raw image.

Step 3: The terminal compresses the raw image or the partial of the raw image according to the related coding information and transmits the compressed bit-stream of the raw image or the partial of the raw image to the cloud.

Step 4: The cloud server decompresses the received compressed bit-stream to obtain the reconstructed raw image or partial of the raw image.

Step 5: The cloud semantic analyzing module performs semantic analyzing on the raw image or the partial raw image and transmits the result of semantic analyzing to the terminal.

Step 6: The ISP module in the terminal optimizes the raw image to be processed according to the result of semantic analyzing.

In the embodiments of the present invention, an encoded raw image is transmitted to a cloud server via network, and the decoded and reconstructed raw image is optimized by an ISP in the cloud server. Compared with the prior art where complex algorithms cannot be implemented by the ISP module in terminal due to its limited computing capacity, better optimizing performance of image processing is realized and the quality of the user viewing image is significantly improved.

To describe the technical solutions of the present invention more clearly, several embodiments of the present invention will be specifically described below.

Embodiment 1

Embodiment 1 of the present invention corresponds to the "cloud camera" system based on the cloud camera-cloud ISP architecture scheme, and relates to an encoding method related to the deep learning network.

As shown in FIG. 12, after acquiring a raw image to be processed, a terminal encodes the raw image to be processed according to the perceptual distortion. In one implementation, the encoding process includes a prediction process and a quantization process.

In the prediction process, first, the specific processing in the step S510 is executed: a perceptual distortion value of each coding unit in the raw image to be processed is determined according to a set of feature values of each coding unit in the raw image to be processed and based on a trained first deep learning model.

Then, an optimal prediction mode for each coding unit is determined according to the perceptual distortion value of each coding unit in the raw image to be processed. Particularly, the rate-distortion cost of each candidate prediction mode for each coding unit is calculated by the determined perceptual distortion value and a prediction mode having the lowest rate-distortion cost is selected as the optimal prediction mode.

In the quantization process, first, the specific processing in the step S510 is executed: an encoding parameter (for example, a quantization parameter) of each coding unit in the raw image to be processed is determined according to a set of feature values of each coding unit in the raw image to be processed and based on a trained second deep learning model.

Then, the raw image is encoded according to the quantization parameter.

Optionally, in the prediction process, first, the first deep learning model is trained for image encoding. The way of training the first deep learning model includes:

acquires the processed image, the raw image corresponding to the processed image and the residual image corresponding to the processed image;

determines a set of feature values and the perceptual distortion value of each coding unit in the raw image corresponding to the processed image; and trains a predetermined neural network according to the raw image corresponding to the processed image, the residual image corresponding to the processed image, the set of feature values and the perceptual distortion value of each coding unit in the raw image corresponding to the processed image, to obtain the first deep learning model.

Known from the foregoing, the training process can be real-time training or off-line training. The real-time training is applicable to encoding and compressing of raw videos, and the off-line training is applicable to encoding and compressing of raw videos and raw images.

Wherein, the real-time training is performed on the terminal. In the prediction process, the hierarchical structure of the deep learning network corresponding to the real-time training includes:

1) a data collection layer configured to collect the previous processed image, the raw image corresponding to the previous processed image, and the residual image of each coding unit in the previous processed image;

2) a feature extraction layer configured to extract feature values of each coding unit in the raw image corresponding to the previous processed image and output a set of feature values of each coding unit, as shown in FIG. 7;

3) a perceptual distortion evaluation layer configured to acquire the perceptual distortion value of each coding unit in the previous processed image; and 4) a multilayer convolutional neural network layer configured to input the raw image corresponding to the previous processed image, the residual image of each coding unit, the set of feature values of each coding unit, and the perceptual distortion value of each coding unit to the multilayer convolutional neural network for training to obtain the first deep learning model.

The off-line training may be performed on the server side or may be performed on the terminal. In the prediction process, the hierarchical structure of the deep learning network corresponding to the off-line training includes:

1) a data collection layer configured to collect historical processed image, the raw image corresponding to the historical processed image, and the residual image of each coding unit in the historical processed image;

2) a feature extraction layer configured to extract the feature values of each coding unit in the raw image corresponding to the historical processed image and output a set of feature values of each coding unit, as shown in FIG. 7;

3) a perceptual distortion evaluation layer configured to acquire the perceptual distortion value of each coding unit in the historical processed image; and 4) a multilayer convolutional neural network layer configured to input the raw image corresponding to the historical processed image, the residual image of each coding unit, the set of feature values of each coding unit, and the perceptual distortion value of each coding unit to the multilayer convolutional neural network for training to obtain the first deep learning model.

It is to be noted that, the trained first deep learning model is used to establish a mapping function between the objective distortion value and the perceptual distortion value of each coding unit in the raw image.

Wherein, the objective distortion value is a Sum of Absolute Difference (SAD) of all pixel differences between each coding unit in the raw image and the corresponding residual image. Optionally, the objective distortion value may also be a Sum of Squared Error (SSE), a Mean Squared Error (MSE), etc.

The perceptual distortion value of each coding unit in the perceptual distortion evaluation layer may be obtained in the following way.

The perceptual distortion value is a Structural Similarity Index (SSIM) between each coding unit in the processed image and the raw image corresponding to the processed image:

$$SSIM = \left(\frac{2\mu_x\mu_y + c_1}{\mu_x^2 + \mu_y^2 + c_1}\right)\left(\frac{2\sigma_{xy} + c_2}{\delta_x^2 + \delta_y^2 + c_2}\right) \quad (1)$$

In the formula (1), $\mu_x$ and $\delta_x^2$ are the average and the variance of all pixels in one coding unit in the raw image corresponding to the processed image, respectively; by and $\delta_y^2$ are the average and the variance of all pixels in one coding unit in the processed image, respectively; $\sigma_{xy}$ is the covariance of all pixels in one coding unit in the processed image and all pixels in one coding unit in the raw image corresponding to the processed image; and, $C_1$ and $C_2$ are constants.

Optionally, the perceptual distortion value may also be a Multiscale-SSIM (MS-SSIM), a Mean Opinion Score (MOS), etc.

Optionally, the perceptual distortion value may also be the difference between the processed image and the raw image corresponding to the processed image under the observation by human eyes. The perceptual distortion value of each coding unit is calibrated artificially. The perceptual distortion value here is used for evaluating the following evaluation results: the perceptual quality is lossless, the perceptual quality has slight loss which is less perceptive, the perceptual quality has significant loss, the perceptual quality deteriorates severely, etc.

Then, in the prediction process, the specific process of applying the first deep learning model to process the raw image to be processed includes steps of:

extracting the feature values of each coding unit in the raw image to be processed to constitute sets of feature values, which is used as the inputs to the first deep learning model; and obtaining, by the first deep learning model, the perceptual distortion value of each coding unit in each candidate prediction mode.

As shown in FIG. 15, the hierarchical structure of the deep learning network used when applying the first deep learning model to process the raw image to be processed includes:

1) a data collection layer configured to acquire a raw image to be processed;

2) a feature extraction layer configured to extract feature values of each coding unit in the raw image to be processed and output a set of feature values of each coding unit, as shown in FIG. 7; and 3) a multilayer convolutional neural network layer configured to input the set of feature values of each coding unit and the residual image of each coding unit in the raw image to be processed to the trained first deep learning model, and output the perceptual distortion value of each coding unit in the raw image to be processed.

Then, the rate-distortion cost of each candidate prediction mode for each coding unit is calculated by the determined perceptual distortion value and a prediction mode having the lowest rate-distortion cost is selected as the optimal prediction mode.

Optionally, in the quantization process, first, a second deep learning model is trained for image encoding. The way of training the second deep learning model includes:

acquiring the processed image, the raw image corresponding to the processed image, the encoding parameter corresponding to the processed image and the number of bits used for encoding;

determining a set of feature values and the perceptual distortion value of each coding unit in the raw image corresponding to the processed image; and training the predetermined neural network according to the raw image corresponding to the processed image, the encoding parameter and the number of bits used for encoding corresponding to the processed image, the set of feature values and the perceptual distortion value of each coding unit in the raw image corresponding to the processed image, to obtain the second deep learning model.

Similarly, the training may be real-time training or off-line training. The real-time training is applicable to encoding and compressing of raw videos, and the off-line training is applicable to encoding and compressing of raw videos and raw images.

Wherein, the real-time training is performed on the terminal. In the quantization process, the hierarchical structure of the deep learning network corresponding to the real-time training includes:

1) a data collection layer configured to collect the previous processed image, the raw image corresponding to the previous processed image, the encoding parameter and the number of bits used for encoding of each coding unit in the previous processed image;

2) a feature extraction layer configured to extract feature values of each coding unit in the raw image corresponding to the previous processed image are extracted and output a set of feature values of each coding unit, as shown in FIG. 7;

3) a perceptual distortion evaluation layer configured to acquire perceptual distortion value of each coding unit in the previous processed image;

4) a multilayer convolutional neural network layer configured to input the raw image corresponding to the previous processed image, the encoding parameter and the number of bits used for encoding of each coding unit, the set of feature values of each coding unit, and the perceptual distortion value of each coding unit to the multilayer convolutional neural network for training to obtain a second deep learning model.

The off-line training may be performed on the server side or may be performed on the terminal. In the quantization process, the hierarchical structure of the deep learning network corresponding to the off-line training includes:

1) a data collection layer configured to collect the historical processed image, the raw image corresponding to the historical processed image, the encoding parameter and the number of bits used for encoding of each coding unit in the historical processed image;

2) a feature extraction layer configured to extract the feature values of each coding unit in the raw image corresponding to the historical processed image and output a set of feature values of each coding unit, as shown in FIG. 7;

3) a perceptual distortion evaluation layer configured to acquire the perceptual distortion value of each coding unit in the historical processed image; and 4) a multilayer convolutional neural network layer configured to input the raw image corresponding to the historical processed image, the encoding parameter and the number of bits used for encoding of each coding unit, the set of feature values of each coding unit and the perceptual distortion value of each coding unit to the multilayer convolutional neural network for training to obtain a second deep learning model.

It is to be noted that, the trained second deep learning model is used to establish a mapping function between the encoding parameter and the number of bits used for encoding of each coding unit in the raw image.

Then, in the quantization process, the specific process of applying the second deep learning model to process the raw image to be processed includes steps of:

extracting the feature values of each coding unit in the raw image to be processed to constitute sets of feature values, which is used as the input to the second deep learning model;

determining the target number of bits of the raw image to be processed according to the network bandwidth; and obtaining the encoding parameter (for example, the quantization parameter) of each coding unit by the second deep learning model, and compressing the raw image to be processed by the encoding parameter of each coding unit.

As shown in FIG. 16, the hierarchical structure of the deep learning network used when applying the second deep learning model to process the raw image to be processed includes:

1) a data collection layer configured to acquire the raw image to be processed;

2) a feature extraction layer configured to extract the feature values of each coding unit in the raw image to be processed and output a set of feature values of each coding unit, as shown in FIG. 7; and 3) a multilayer convolutional neural network layer configured to input the set of feature values of each coding unit in the raw image to be processed and the target number of bits of the raw image to be processed to the trained second deep learning model, and output the quantization parameter of each coding unit in the raw image to be processed.

Then, the terminal may execute the encoding process in the step S520. A raw image to be processed is encoded according to the optimal prediction mode and the encoding parameter of each coding unit in the raw image to be processed to generate a compressed bit-stream of the raw image to be processed, and the compressed bitstream is transmitted to the cloud server.

In the embodiments of the present invention, the raw image decoder of the cloud server decodes the received compressed bit-stream to obtain the reconstructed image. The decoding process is as shown in FIG. 10, including steps of:

obtaining the quantization parameter of each coding unit in the raw image to be processed, and the optimal prediction mode and the residual value of each of four color channels from the compressed bit-stream;

for any one of coding units, performing inverse quantization and inverse transformation on the residual value of each of four color channels by the obtained quantization parameter; and obtaining the prediction value of each of four color channels of the unit to be decoded by the obtained optimal prediction mode of each of four color channels, and adding the prediction value and the difference obtained after inverse quantization and inverse transformation are performed on the residual value to obtain the reconstructed value of the unit to be decoded.

The raw image to be processed, which is processed in the above step, is in the four-channel image format shown in FIG. 9a. In the practical application, it may be in the six-channel image format shown in FIG. 9b. The differences of the processing processes lie in that:

the quantization parameter of each coding unit in the raw image to be processed, and the optimal prediction mode and the residual value of each of six color channels are obtained from the compressed bit-stream;

for any one of coding units, inverse quantization and inverse transformation are performed on the residual value of each of six color channels by the obtained quantization parameter; and the prediction value of each of six color channels of the unit to be decoded is obtained by the obtained optimal prediction mode of each of six color channels and the prediction value is added to the difference obtained after inverse quantization and inverse transformation are performed on the residual value to obtain the reconstructed value of the unit to be decoded.

Then, the cloud performs ISP optimization on the reconstructed raw image and transmits the processed image to the terminal.

Optionally, in the embodiments of the present invention, as shown in FIG. 12, the cloud semantic analyzing module and the ISP module may be used to analyze and optimize the reconstructed raw image, respectively. Wherein, the processing process performed by the cloud semantic analyzing module refers to Embodiment 3 below and will not be repeated here.

Embodiment 2

Embodiment 2 of the present invention corresponds to a "cloud camera" system based on the cloud camera-cloud ISP architecture scheme, and relates to an encoding method related to the mathematical model method.

Considering of the high noise of raw image, it is not possible to directly encode raw image using existing techniques. Meanwhile, in order to achieve perceptual quality lossless after compression under limited bit-rate, the present embodiment proposes a raw image encoding method based on the mathematical model methods. The key idea is to allocate relative more bits to perceptual distortion sensitive areas, fewer bits to perceptual distortion insensitive areas. It is worth noting that, the distortion we mentioned in this paper is between the raw image captured by sensor and the user viewing image processed by post-processing module.

As shown in FIG. 12, after acquiring a raw image to be processed, the terminal encodes the raw image to be processed according to perceptual distortion.

Particularly, as shown in FIG. 17, first, the specific processing in the step S510 is executed:

The initial encoding parameters are obtained from a configure file or manual input, the initial encoding parameters include the initial quantization parameter, the target number of bits for encoding of the raw image to be processed, and the number of coding units in the raw image to be processed.

Updating of status: for the current coding unit to be processed, the remaining number of bits b' and the remaining number of non-encoded coding units N' are calculated.

Feature extraction: the feature information of the current coding unit to be processed is calculated.

Based on the trained first model, the perceptual distortion related information corresponding to the current coding unit to be processed is determined.

At this time, the first model includes a first mathematical model, in this step, the perceptual distortion sensitivity type and corresponding weighting factor w of current coding unit to be processed is determined according to a set of feature values of current coding unit to be processed and based on a trained first mathematical model.

Optionally, a target number of bits T of the current coding unit to be processed is determined according to the weighting factor corresponding to the current coding unit to be processed.

$$T = w \times \frac{b'}{N'}$$

Then, the specific processing in the step S510 is executed: the encoding parameter of the current coding unit to be processed is determined, according to the feature information of current coding unit to be processed in the raw image to be processed and the obtained target number of bits, based on a trained second model.

At this time, the second model includes the second mathematical model. In this step, obtain the feature information and coding information of neighboring coding units of the current coding unit to be processed, wherein, the coding information includes: the number of consumed bits and quantization parameter. The encoding parameter of the current coding unit to be processed is determined, according to the set of feature value of current coding unit to be processed in the raw image to be processed and the obtained target number of bits of current coding unit to be processed, based on a trained second mathematical model. For example, quantization parameter: $Q_n = \overline{Q} + \Delta Q$, wherein, n is the serial number of the currently coding unit to be processed, and for n=0, $Q_n = Q_{init} + \Delta Q$, wherein $Q_{init}$ is the initial quantization parameter. $\Delta Q$ is the difference between the quantization parameter of the current coding unit to be processed and an average of the quantization parameter of the neighboring coding units:

$$\Delta Q = \frac{\Delta b - (a_1 \overline{Q}^2 + a_2 \overline{Q} + a_3) \frac{1}{\overline{G}} \times \Delta G}{(2a_1 \ln \overline{GQ} + a_2 \ln \overline{G} + 2b_1 \overline{Q} + b_2)}$$

In the above formula, $\overline{G}$ is an average of the feature value of the neighboring coding units of the current coding unit to be processed, which is an average of the texture complexity in this embodiment, and $\hat{Q}$ is an average of quantization parameter of the neighboring coding units of the current coding unit to be processed. As shown in FIG. 18, neighboring blocks refer to a left block, an upper left block, an upper block and an upper right block with respect to the current block $\Delta G$ is a difference between the feature value (G) of current coding unit to be processed and $\overline{G}$; $\Delta b$ is a difference between the target number of bits for encoding of the current coding unit to be processed and the average of the numbers of bits for encoding of neighboring coding units.

Then, clip the calculated value of the quantization parameter to the effective range, and the effective range in this embodiment is greater than or equal to 0, and less than or equal to 51. The current coding unit to be processed is encoded according to the quantization parameter.

The above steps are performed, until the coding processing on all coding units in the raw image to be processed is completed.

Optionally, the first mathematical model and the second mathematical model need to be trained to process encoding of the image.

Also, as shown in FIG. 17, the way of training the first mathematical model includes:

acquiring a processed image and the raw image corresponding to the processed image; and determining a set of feature values of each coding unit in the raw image corresponding to the processed image and a set of feature values of each coding unit in the processed image; and training a predetermined first mathematical relationship model according to the set of feature values of each coding unit in the raw image corresponding to the processed image and the set of feature values of each coding unit in the processed image to obtain the first mathematical model.

The training may be real-time training which is applicable to the compressing of raw videos or off-line training which is applicable to the compressing of raw videos and raw images.

Wherein, the real-time training is performed on the terminal. The real-time training of the first mathematical model is as follows:

the previous processed image and the raw image corresponding to the previous processed image are acquired;

a set of feature values of each coding unit in the previous processed image is calculated, and a set of feature values includes the feature values as shown in the followings table:

| Abbreviations of feature value | Description | Formulation |
|---|---|---|
| DARK | Dark | $I = \sum_{ch} \left\{ w_{ch} \sum_{f=1}^{N \times N} (I_i^{ch}) \right\} \le th_{low}^I$ |
| GRAY | Gray | $th_{low}^I < I = \sum_{ch} \left\{ w_{ch} \sum_{i=1}^{N \times N} (I_i^{ch}) \right\} \le th_{high}^I$ |
| BRIGHT | Bright | $th_{high}^I < I = \sum_{ch} \left\{ w_{ch} \sum_{i=1}^{N \times N} (I_i^{ch}) \right\}$ |
| HOMO | Homogeneous | $G = \sum_{ch} \left\{ w_{ch} \left( \frac{1}{N} \sum_{i}^{N \times N} \sqrt{G_i^{ch2}} \right) \right\} \le \text{thr\_edge\_low}$ |
| GC | Gradual change | $\text{thr\_edge\_low} < G = \sum_{ch} \left\{ w_{ch} \left( \frac{1}{N} \sum_{i}^{N \times N} \sqrt{G_i^{ch2}} \right) \right\} \le \text{thr\_edge\_high}$ |
| SE | Strong edge | $\text{thr\_edge\_high} < G = \sum_{ch} \left\{ w_{ch} \left( \frac{1}{N} \sum_{i}^{N \times N} \sqrt{G_i^{ch2}} \right) \right\}$ |
| WS | Wide stripes | The number of subblocks with strong texture is less than half |
| DNS | Dense narrow stripes | All subblocks have strong texture |
| ETP | Directional edge (easy to predict) | $\text{var}(G_{subblok}) \le th_{low}^{var}$ |
| DTP | Random texture (difficult to predict) | $th_{high}^{var} < (G_{subblok})$ |

In the above table, I represents a luminance value; i denotes the number of pixels in a coding unit; N*N is the total amount of pixels in a coding unit; ch represents a color channel; and $W_{ch}$ is a weighting factor of each color channel. G represents a texture complexity and is obtained by the following formula. In the following calculation formula, A is a source image, and $G_x$, $G_y$, $G_{d1}$, and $G_{d2}$ are the directional gradient images calculated by four 3*3 Sobel operators, respectively. The gradient $G_{ch}$ is calculated from the four directional gradient images of each color channel. The texture complexity G of each coding unit is obtained by weighted average $G_{ch}$ of four color channels.

$$G_x = \begin{bmatrix} +1 & 0 & -1 \\ +2 & 0 & -2 \\ +1 & 0 & -1 \end{bmatrix} \cdot A$$

$$G_y = \begin{bmatrix} +1 & +2 & +1 \\ 0 & 0 & 0 \\ -1 & -2 & -1 \end{bmatrix} \cdot A$$

$$G_{d1} = \begin{bmatrix} +2 & +1 & 0 \\ +1 & 0 & -1 \\ 0 & -1 & -2 \end{bmatrix} \cdot A$$

$$G_{d2} = \begin{bmatrix} 0 & -1 & -2 \\ +1 & 0 & -1 \\ +2 & +1 & 0 \end{bmatrix} \cdot A$$

$$G_{ch} = \frac{1}{N} \sum_{i}^{N} \sqrt{G_x^{i2} + G_y^{i2} + G_{d1}^{i2} + G_{d2}^{i2}},$$

-continued $$ch = G1, G2, B, R$$

$$G = G_{G1} + G_{G2} + 2 \times G_B + 2 \times G_R$$

$\text{var}(G_{subblok})$ represents a variance of the texture complexity of the subunits in the coding unit. Thresholds in the table: $th_{low}^I$, $th_{high}^I$, thr_edge_low, thr_edge_high, $th_{low}^{var}$, $th_{high}^{var}$, are obtained by experiment.

The feature values are combined, and one coding unit corresponds to one or several combinations of feature value. A feature value combination image of is obtained.

The perceptual distortion between the previous processed image (the image viewed by the user) and the raw image corresponding to the previous processed image is calculated, to obtain score (referring to perceptual distortion) mask image. In this embodiment, the perceptual distortion value is calculated by 1-SSIM:

$$1 - SSIM = 1 - \left( \frac{2\mu_x \mu_y + c_1}{\mu_x^2 + \mu_y^2 + c_1} \right) \left( \frac{2\sigma_{xy} + c_2}{\delta_x^2 + \delta_y^2 + c_2} \right),$$

and it can also be calculated by 1-MS-SSIM, 10-MOS, and etc.

Several score (referring to perceptual distortion) intervals are divided. In this embodiment, seven score intervals are divided, and rank the intervals according to the descending order of the scores, and the serial number indicates the perceptual distortion level, that is, the perceptual distortion sensitivity type. And a perceptual distortion level of each coding unit is obtained according to the score interval corresponding to the perceptual distortion of each coding unit, to obtain a level mask image.

Specifically, a weighted combination matrix M is obtained according to the statistic that includes the probability of the combination of the feature values recognizing the perceptual distortion level of each coding unit in the image. M is a matrix of size JXI. Each element value in the The raw image corresponding to the historical processed image is obtained. The raw image corresponding to the historical processed image is processed by the following two paths.

Path One:

A set of feature value of each coding unit in the raw image corresponding to the historical processed image is calculated, and the set of feature value includes the feature values as shown in the followings table:

| Abbreviations of feature value | Description | Formulation |
| --- | --- | --- |
| DARK | Dark | $I = \sum_{ch}\left\{w_{ch}\sum_{f=1}^{N \times N}(I_i^{ch})\right\} \leq th_{low}^I$ |
| GRAY | Gray | $th_{low}^I < I = \sum_{ch}\left\{w_{ch}\sum_{i=1}^{N \times N}(I_i^{ch})\right\} \leq th_{high}^I$ |
| BRIGHT | Bright | $th_{high}^I < I = \sum_{ch}\left\{w_{ch}\sum_{i=1}^{N \times N}(I_i^{ch})\right\}$ |
| HOMO | Homogeneous | $G = \sum_{ch}\left\{w_{ch}\left(\frac{1}{N}\sum_{i}^{N \times N}\sqrt{G_i^{ch2}}\right)\right\} \leq \text{thr\_edge\_low}$ |
| GC | Gradual change | $\text{thr\_edge\_low} < G = \sum_{ch}\left\{w_{ch}\left(\frac{1}{N}\sum_{i}^{N \times N}\sqrt{G_i^{ch2}}\right)\right\} \leq \text{thr\_edge\_high}$ |
| SE | Strong edge | $\text{thr\_edge\_high} < G = \sum_{ch}\left\{w_{ch}\left(\frac{1}{N}\sum_{i}^{N \times N}\sqrt{G_i^{ch2}}\right)\right\}$ |
| WS | Wide stripes | The number of subblocks with strong texture is less than half |
| DNS | Dense narrow stripes | All subblocks have strong texture |
| ETP | Directional edge (easy to predict) | $\text{var}(G_{subblok}) \leq th_{low}^{var}$ |
| DTP | Random texture (difficult to predict) | $th_{high}^{var} < \text{var}(G_{subblok})$ | matrix is the probability of $p(c(j, i)|l_n)$, which is combined of the feature value $f_j$ and $e_i$, recognizing the perceptual distortion level ln:

$$p(c(j,i)|l_n) = \text{sum}_{l_n}^{c(j,i)}/\text{sum}_{l_n}$$

In the above formula, ln represents the perceptual distortion level; c(j, i) represents the combination of the feature values $f_j$ and $e_i$; $\text{sum}_{l_n}$ represents the number of coding units in the image whose perceptual distortion level is ln; and $\text{sum}_{l_n}^{c(j,i)}$ represents the number of coding units whose the perceptual distortion level is ln and the combination of feature values is c(j, i).

The combination of feature values with the highest probability is mapped to its corresponding perceptual distortion level, and the model of the relationship of "feature value set-perceptual differences" is obtained.

The first mathematical model (i.e. the model based on the "feature value set-perceptual differences" relationship) may be trained by the above data.

The off-line training may be performed on the server side or may be performed on the terminal. The off-line training of the first mathematical model is as follows, as shown in FIG. 32:

In the above table, I represents a luminance value; i denotes the number of pixels in a coding unit; N×N is the total amount of pixels in a coding unit; ch represents a color channel; and wo is a weighting factor of each color channel. G represents a texture complexity and is obtained by the following formula. In the following calculation formula, A is a source image, and $G_x$, $G_y$, $G_{d1}$, and $G_{d2}$ are the directional gradient images calculated by four 3×3 Sobel operators, respectively. The gradient $G_{ch}$ is calculated from the four directional gradient images of each color channel. The texture complexity G of each coding unit is obtained by weighted average $G_{ch}$ of four color channels.

$$G_x = \begin{bmatrix} +1 & 0 & -1 \\ +2 & 0 & -2 \\ +1 & 0 & -1 \end{bmatrix} \cdot A$$

$$G_y = \begin{bmatrix} +1 & +2 & +1 \\ 0 & 0 & 0 \\ -1 & -2 & -1 \end{bmatrix} \cdot A$$

-continued $$G_{d1} = \begin{bmatrix} +2 & +1 & 0 \\ +1 & 0 & -1 \\ 0 & -1 & -2 \end{bmatrix} \cdot A$$

$$G_{d2} = \begin{bmatrix} 0 & -1 & -2 \\ +1 & 0 & -1 \\ +2 & +1 & 0 \end{bmatrix} \cdot A$$

$$G_{ch} = \frac{1}{N}\sum_i^N \sqrt{G_x^{i2} + G_y^{i2} + G_{d1}^{i2} + G_{d2}^{i2}},$$

$$ch = G1, G2, B, R$$

$$G = G_{G1} + G_{G2} + 2 \times G_B + 2 \times G_R$$

var($G_{subblok}$) represents a variance of the texture complexity of the subunits in the coding unit. Thresholds in the table: $th_{low}^l$, $th_{high}^l$, thr_edge_low, thr_edge_high, $th_{low}^{var}$, $th_{high}^{var}$, are obtained by experiment.

The feature values are combined, and one coding unit corresponds to one or several combinations of feature value. An image of combinations of feature value is obtained.

Path Two:

The raw image corresponding to the historical processed image is encoded with quantization parameters used for encoding.

A reconstructed raw image is obtained by decoding.

The reconstructed raw image is processed by ISP, to obtain the user viewing image.

The perceptual distortion between each coding unit in the user viewing image and each coding unit in the previous raw image is calculated, to obtain score (referring to perceptual distortion) mask image. In this embodiment, the perceptual distortion is calculated by 1-SSIM:

$$1 - SSIM = 1 - \left(\frac{2\mu_x\mu_y + c_1}{\mu_x^2 + \mu_y^2 + c_1}\right)\left(\frac{2\sigma_{xy} + c_2}{\delta_x^2 + \delta_y^2 + c_2}\right),$$

and it can also be calculated by 1-MS-SSIM, 10-MOS, and the etc.

Several score (referring to perceptual distortion) intervals are divided. In this embodiment, seven score intervals are divided, and the intervals are ranked according to the descending order of the scores, and the serial number indicates the perceptual distortion level, that is, the perceptual distortion sensitivity type. And a perceptual distortion level of each coding unit is obtained according to the score interval corresponding to the perceptual distortion of each coding unit, to obtain a level mask image.

The raw image is processed and calculated by the above two paths to establish a classification rule, that is, it is to distinguish whether the pattern of raw image is perceptual distortion sensitive or not, and label it with a relative level to denote its perceptual distortion sensitivity type. This embodiment uses as many candidate feature values as possible to obtain classification rules, in order to improve the performance of the first mathematical model. This embodiment proposes a weighted combination matrix, each element that corresponds to a feature value combination is assigned a probability to measure the confidence of combining the feature values.

As an example shown in FIG. 34, FIG. 34(b) is a weighted combination matrix in which the feature values DARK, GRAY, HOMO and DNS are combined. Intuitively, the merits of the correspondence between combination of the feature values and the level is estimated, by calculating the probability of a certain combination of feature values to recognize a certain perceptual distortion type (level). As shown in FIG. 34, it is assumed that the probabilities of combinations of four feature values to recognize the perceptual distortion level of 5 are 0.7, 0.87, 0.3, and 0.95, respectively. FIG. 34(a) is a diagram showing an example of a perceptual distortion level of 5. According to the matrix shown in FIG. 34 (b), it can be said that the combination of feature values (GRAY, DNS) can recognize the perceptual distortion level of 5. The combination of feature values (GRAY, HOMO) hardly recognizes the perceptual distortion level of 5. The combination of feature values (DARK, DNS) has an 87% probability of recognizing the perceptual distortion level of 5.

Specifically, a weighted combination matrix M is obtained according to the statistic that includes the probability of the combination of the feature values recognizing the perceptual distortion level of each coding unit in the image. M is a matrix of size J×I. Each element value in the matrix is the probability of c(j, i), which is combined of the feature value $f_j$ and $e_i$, recognizing the perceptual distortion level in:

$$p(c(j,i)|l_n) = \text{sum}_{ln}^{c(j,i)}/\text{sum}_{ln}$$

In the above formula, ln represents a perceptual distortion level; c(j, i) represents a combination of the feature values $f_j$ and $e_i$; and $\text{sum}_{ln}$ represents the number of coding units in the image whose perceptual distortion level is ln; $\text{sum}_{ln}^{c(j,i)}$ represents the number of coding units whose the perceptual distortion level is in and the combination of feature values is c(j, i).

The combination of feature values with the highest probability is mapped to its corresponding perceptual distortion level, and the model of the relationship of "feature value set-perceptual differences" is obtained.

The first mathematical model (i.e. the model based on the "feature value set-perceptual differences" relationship, or a "perceptual distortion sensitivity model") may be trained by the above data. In this embodiment, seven perceptual distortion levels are used. The smaller the value of the perceptual distortion level, the more sensitive the user is to the perceptual distortion of the coding unit, and vice versa.

Particularly, the first mathematical model contains:

1) perceptual distortion sensitive blocks, i.e., blocks having a perceptual difference less than a set threshold, with the following texture types corresponding feature values and weighting factors (w), respectively:

perceptual distortion level of 0, gray, weak texture—the average of brightness is between an upper brightness threshold and a lower brightness threshold, and the texture complexity (G) is between an upper gradient threshold (thr_edge_high) and a lower gradient threshold (thr_edge_low)—

$$w = \frac{1}{\alpha \times (\text{thr\_edge\_low} - G) + 1};$$

perceptual distortion level of 1, dark, homogeneous—the average of brightness is less than the lower brightness threshold and the texture complexity is less than the lower gradient threshold—w=β×(thr_edge_low−G)+1, perceptual distortion level of 2, strong texture, with wide stripes—the texture complexity is greater than the upper gradient threshold and the coding unit contains wide stripe—

$$w = \frac{1}{\alpha \times (\text{thr\_edge\_high} - G) + 1};$$

and perceptual distortion level of 3, strong texture, dense narrow stripe, inhomogeneous texture—the texture complexity is greater than the upper gradient threshold, the coding unit contains no wide stripe, and texture directions are different—

$$w = \frac{1}{\alpha \times (\text{thr\_edge\_high} - G) + 1};$$

where, the parameters α and β are preset values, and optionally, α=0.005 and β=0.7042, or they may be set as different values according to an exposure factor of the camera;

2) perceptual distortion insensitive blocks, i.e., blocks having a perceptual difference greater than the set threshold, with the following texture types—corresponding feature values—and weighted factors (w), respectively:

perceptual distortion level of 5, bright, homogeneous—the average of brightness is greater than the upper brightness threshold and the texture complexity is less than the lower gradient threshold—

$$w = \frac{1}{\beta \times (\text{thr\_edge\_low} - G) + 1};$$

and perceptual distortion level of 6, strong texture, dense narrow stripe, homogeneous texture—the texture complexity is greater than the upper gradient threshold, the coding unit contains no wide stripe and texture directions are the same—w=α×(thr_edge_high−G)+1;

wherein, the parameters c and pare preset values, and optionally, α=0.005 and β=0.7042, or they may be set are different values according to an exposure factor of the camera; and 3) perceptual distortion level of 4, general blocks, i.e., blocks having a perceptual difference equal to the set threshold, including blocks rather than the perceptual distortion sensitive blocks and the perceptual distortion insensitive blocks, with a weighted factor w=1.

Also, as shown in FIG. 17, the way of training the second mathematical model includes:

acquiring the encoding parameter and the number of bits used for encoding corresponding to the processed image; and determining a set of feature values of each coding unit in the raw image corresponding to the processed image and the encoding parameter and the number of bits used for encoding corresponding to the processed image, and training a predetermined second mathematical relationship model to obtain the second mathematical model.

Similarly, the training may be real-time training or off-line training. The real-time training is applicable to encoding and compressing of raw videos, and the off-line training is applicable to encoding and compressing of raw videos and raw images.

Wherein, the real-time training way is performed on the terminal. The real-time training of the second mathematical model is as follows:

the encoding parameter and the number of bits used for encoding of each coding unit in the previous processed image are acquired; and a set of feature values of each coding unit in the raw image corresponding to the previous processed image is calculated.

In this embodiment, the set of feature value only includes the texture feature, which is calculated by using the texture complexity (G), and may also include other features.

A correspondence between the number of bits used by each coding unit in the previous processed image and the texture feature of each coding unit is obtained.

$$B = f(G)|_{Q=q} = \beta_1 \times \ln(G) + \beta_2$$

In the above formula, B is the number of bits used by a coding unit; f(G) represents a texture feature of a coding unit; G is a texture complexity of a coding unit; Q=q represents that the quantization parameter Q is equal to the specific quantization parameter value q; and $\beta_1$ and $\beta_2$ are parameters.

The relationship between the parameters $\beta_1$ and $\beta_2$ and QP is established:

$$\beta 1 = f_{\beta 1}(Q)|_{G=g} = a_1 \times Q^2 + a_2 \times Q + a_3$$

$$\beta 2 = f_{\beta 2Q}(Q)|_{G=g} = b_1 \times Q^2 + b_2 \times Q + b_3$$

In the above formula, Q is the quantization parameter QP; $f_{\beta 1}(Q)$ and $f_{\beta 2}(Q)$ indicate that $\beta_1$ and $\beta_2$ are functions of QP; G=g indicates that the texture complexity G is equal to the specific quantization parameter value g; and $a_1, a_2, a_3, b_1, b_2, b_3$ are model parameters, obtained by fitting experimental data. Substituting the above relationship formula between $\beta_1$ and $\beta_2$ and QP into the relationship formula between B and G, to obtain the number of bits. The relationship between feature value and quantization parameter is as below:

$$B = (a_1 \ln(G) + b_1) \times Q^2 + (a_2 \ln(G) + b_2) \times Q + (a_3 \ln(G) + b_3)$$

Taking derivative of the above formula with respect to Q, and the variation ΔQ of the quantization parameter is calculated:

$$\Delta B = \frac{\partial B}{\partial C}\bigg|_{Q=q} + \frac{\partial B}{\partial Q}\bigg|_{G=g} =$$

$$(a_1 Q^2 + a_2 Q + a_3)\frac{1}{G} \times \Delta G + (2a_1 \ln G \times Q + a_2 \ln G + 2b_1 Q + b_2) \times \Delta Q$$

$$\frac{\partial B}{\partial C}\bigg|_{Q=q} = (a_1 Q^2 + a_2 Q + a_3)\frac{1}{G}$$

$$\frac{\partial B}{\partial Q}\bigg|_{G=g} = (2a_1 \ln(G)Q + a_2 \ln(G) + 2b_1 Q + b_2)$$

$$\Delta Q = \frac{\Delta b - (a_1 \overline{Q}^2 + a_2 \overline{Q} + a_3)\frac{1}{G} \times \Delta G}{(2a_1 \ln(\overline{G})Q + a_2 \ln(\overline{G}) + 2b_1 \overline{Q} + b_2)}$$

In the above formula, $\overline{G}$ is an average of the texture complexity of the coding units adjacent to the current coding unit, and $\overline{Q}$ is an average of quantization parameter of the coding units adjacent to the current coding unit. As shown in FIG. 18, adjacent blocks refer to a left block, an upper left block, an upper block and an upper right block with respect to the current block; ΔG is a difference between the texture complexity (G) of the current coding unit and $\overline{G}$; $\Delta b$ is a difference between the target number of bits for encoding of the current coding unit and the average of the numbers of bits for encoding of adjacent coding units; $\Delta Q$ is the difference between the quantization parameters of the current coding unit and an averages of the quantization parameters of the adjacent coding units.

The second mathematical model (i.e. the model of "the number of bits-feature value set-quantization parameter" relationship), that is, the calculation formula of quantization parameter Q of each coding unit, is obtained.

$$Q = \overline{Q} + \Delta Q = \frac{\Delta b - (a_1 \overline{Q}^2 + a_2 \overline{Q} + a_3)\frac{1}{\overline{G}} \times \Delta G}{(2a_1 \ln(\overline{G})\overline{Q} + a_2 \ln(\overline{G}) + 2b_1 \overline{Q} + b_2)}$$

The second mathematical model (i.e. the model based on the "the number of bits-feature value set-quantization parameter" relationship) may be trained by the above data.

The off-line training may be performed on the server side or may be performed on the terminal. The off-line training of the second mathematical model is as follows:

the encoding parameter and the number of bits used for encoding of each coding unit in the historical processed image are acquired; and a set of feature values of each coding unit in the raw image corresponding to the historical processed image is calculated.

The historical processed image is encoded with several quantization parameters (QP), to obtain the correspondence between the number of bits used by each coding unit and the feature value of each coding unit in the historical processed image.

On one hand, when a specific QP is used to encode a raw image, the number of bits used by each coding unit is determined by its texture feature. To simplify the definition, the texture feature in this embodiment is calculated by using texture complexity (G) and ignoring other feature values, while other features may be included in other embodiments. Therefore, the "the number of bits-texture feature" model is established firstly, the number of bits B is a linear equation of the natural logarithm of the texture complexity G:

$$B = f(G)|_{Q=q} = \beta_1 \times \ln(G) + \beta_2$$

In the above formula, B is the number of bits used by a coding unit; f(G) represents the texture feature of a coding unit; G is the texture complexity of the coding unit; Q=q represents that the quantization parameter Q is equal to the specific quantization parameter value q; and $\beta_1$ and $\beta_2$ are parameters.

On the other hand, when several QPs are used to encode a raw image of a specific pattern (specific texture feature), the number of bits used by the coding unit is determined by the QP value. Therefore, a quadratic polynomial of the relationship between the parameters $\beta_1$ and $\beta_2$ and QP is established:

$$\beta_1 = f_{\beta_1}(Q)|_{G=g} = a_1 \times Q^2 + a_2 \times Q + a_3$$

$$\beta_2 = f_{\beta_2}(Q)|_{G=g} = b_1 \times Q^2 + b_2 \times Q + b_3$$

In the above formula, Q is the quantization parameter QP, $f_{\beta_1}(Q)$ and $f_{\beta_2}(Q)$ indicate that $\beta_1$ and $\beta_2$ are functions of QP; G=g indicates that the texture complexity G is equal to the specific quantization parameter value g; and $a_1$, $a_2$, $a_3$, $b_1$, $b_2$, $b_3$ are model parameters, obtained by fitting experimental data. Substituting the above relationship formula between $\beta_1$ and $\beta_2$ and QP into the relationship formula between B and G, the relationship of the number of bits, feature value and quantization parameter is obtained:

$$B = (a_1 \ln(G) + b_1) \times Q^2 + (a_2 \ln(G) + b_2) \times Q + (a_3 \ln(G) + b_3)$$

Taking derivative of the above formula with respect to Q, the variation $\Delta Q$ of the quantization parameter is calculated:

$$\Delta B = \frac{\partial B}{\partial C}\bigg|_{Q=q} + \frac{\partial B}{\partial Q}\bigg|_{G=g} =$$

$$(a_1 Q^2 + a_2 Q + a_3)\frac{1}{G} \times \Delta G + (2a_1 \ln G \times Q + a_2 \ln G + 2b_1 Q + b_2) \times \Delta Q$$

$$\frac{\partial B}{\partial C}\bigg|_{Q=q} = (a_1 Q^2 + a_2 Q + a_3)\frac{1}{G}$$

$$\frac{\partial B}{\partial Q}\bigg|_{G=g} = (2a_1 \ln(G)Q + a_2 \ln(G) + 2b_1 Q + b_2)$$

$$\Delta Q = \frac{\Delta b - (a_1 \overline{Q}^2 + a_2 \overline{Q} + a_3)\frac{1}{\overline{G}} \times \Delta G}{(2a_1 \ln(\overline{G})\overline{Q} + a_2 \ln(\overline{G}) + 2b_1 \overline{Q} + b_2)}$$

In the above formula, $\overline{G}$ is an average of the feature value of the coding units adjacent to the current coding unit, which is the texture complexity in this embodiment, and $\overline{Q}$ is an average of quantization parameters of the coding units adjacent to the current coding unit. As shown in FIG. 18, adjacent blocks refer to a left block, an upper left block, an upper block and an upper right block with respect to the current block; $\Delta G$ is a difference between the feature value (G) of the current coding unit and $\overline{G}$; $\Delta b$ is a difference between the target number of bits for encoding of the current coding unit and an average of the numbers of bits for encoding of adjacent coding units; $\Delta Q$ is a difference between the quantization parameter of the current coding unit and an average of the quantization parameter of the adjacent coding units.

The second mathematical model (i.e. the model of "the number of bits-feature value set-quantization parameter" relationship), that is, the calculation formula of quantization parameter Q of each coding unit, is obtained.

$$Q = \overline{Q} + \Delta Q = \frac{\Delta b - (a_1 \overline{Q}^2 + a_2 \overline{Q} + a_3)\frac{1}{\overline{G}} \times \Delta G}{(2a_1 \ln(\overline{G})\overline{Q} + a_2 \ln(\overline{G}) + 2b_1 \overline{Q} + b_2)}$$

The second mathematical model (i.e. the model based on the "the number of bits-feature value set-quantization parameter" relationship) may be trained by the above data.

Particularly, the second mathematical model is:

$$Q = \overline{Q} + \frac{\Delta b - (a_1 \overline{Q}^2 + a_2 \overline{Q} + a_3)\frac{1}{\overline{G}} \times \Delta G}{(2a_1 \ln(\overline{G}) \times \overline{Q} + a_2 \ln(\overline{G}) + 2b_1 \overline{Q} + b_2)} \quad (2)$$

In the formula (2), $\overline{G}$ is an average of texture complexity of coding units adjacent to the current coding unit, and $\overline{Q}$ is an average of quantization parameters of coding units adjacent to the current coding unit. As shown in FIG. 18, adjacent blocks refer to a left block, an upper left block, an upper block and an upper right block with respect to the current block. $\Delta G$ is a difference between the feature value (G) of the current coding unit and $\overline{G}$; $\Delta b$ is a difference between the number of bits for encoding of the current coding unit and the average of the numbers of bits for encoding of adjacent coding units; and ΔQ is a difference between the quantization parameter of the current coding unit and an average of the quantization parameter of the adjacent coding units.

Optionally, as shown in FIG. 33, the specific process of applying the first mathematical model to process the raw image to be processed includes steps of:

acquiring a raw image to be processed, and dividing it into several coding units;

calculating a set of feature values of each coding unit in the raw image to be processed, and combining the feature values into one of seven combinations of feature values according to first mathematical model; and obtaining the perceptual distortion sensitivity type (level) and the corresponding weighting factor (i.e. the weighted factor w) of each coding unit by the trained first mathematical model according to the data.

Optionally, the specific process of applying the second mathematical model to process the raw image to be processed includes steps of:

obtaining a target number of bits T of coding unit to be processed in the raw image calculated by the following formula:

$$T = w \times \frac{b'}{N'} \quad (3)$$

In the formula (3), b' is the remaining number of bits and N' is the number of the remaining unencoded coding units.

The feature information and coding information of coding units adjacent to coding unit to be processed are obtained, and the coding information may include encoding parameters and the numbers of bits for encoding, as shown in FIG. 18. The quantization parameter (i.e. Q in the formula (2)) of coding unit to be processed is obtained by the trained second mathematical model according to the data.

Then, the terminal may execute the encoding process in the step S520. The compressed bit-stream of the raw image to be processed is generated and transmitted to the cloud server.

In the embodiments of the present invention, the decoding and subsequent processing by the cloud server may refer to the above Embodiment 1 and will not be repeated here.

The simulation result of the embodiments of the present invention will be described below.

As shown in FIG. 29, the image is obtained by processing an existing raw image by an ISP module.

As shown in FIG. 30, the image is obtained by compressing, decoding and reconstructing the raw image as described in Embodiment 2 of the present invention and then by processing it by the ISP module. Wherein, the compression ratio is 4.39:1, the Peak Signal to Noise Ratio (PSNR) is 50.46 dB and the SSIM is 0.973138.

As shown in FIG. 31, the image is obtained by compressing and reconstructing by a general image compression method as described in the prior art and then by processing it by the ISP module. Wherein, the compression ratio is 4.0:1, the PSNR is 45.09 dB and the SSIM is 0.922561.

It can be seen that, details in hair area, circled in the image obtained by the method of Embodiment 2 of the present invention are retained more completely and are basically consistent with the original image, while hair circled in the image obtained by the existing compression method for general images becomes blurry, with high details loss.

Also, by the method of Embodiment 2 of the present invention, an image compression ratio higher than that of the existing method may be obtained, that is, more bandwidth may be saved, in the best case, the PSNR is increased by 5.37 dB and the SSIM is increased by 0.05057.

The following table shows the results of an experimental test using a bare image taken under several ISO (exposure). The ΔPSNR is a difference ($PSNR_{conv}$) between a PSNR value ($PSNR_{prop}$) of the user-viewed image that is obtained by ISP processing an image encoded by the method in the second embodiment, and a PSNR value of the user-viewed image that is obtained by ISP processing an image encoded by the general method. The ΔSSIM is a difference ($SSIM_{conv}$) between the SSIM value ($SSIM_{prop}$) of the user-viewed image that is obtained by ISP processing an image encoded by the method in the second embodiment, and an SSIM value of the user-viewed image that is obtained by ISP processing an image encoded by the general method. A positive difference indicates that the objective quality (PSNR) or subjective quality (SSIM) of the second embodiment is better, and a negative difference indicates that the objective quality (PSNR) or subjective quality (SSIM) of the second embodiment is worse. On average, the objective performance of the second embodiment is slightly worse, and the subjective performance is slightly better. The last column in Table 1 is a difference between the code rate in the second embodiment and the target code rate, that is, the accuracy of the code rate control, which is obtained by the following formula, $bits_{target}$ in the formula is the target number of bits, and the $bits_{prop}$ is the number of bits for encoding used by the method in second embodiment:

TABLE 1

|  |  | General image compression method | | Method in the embodiment 2 | |  |  | Rate control |
| --- | --- | --- | --- | --- | --- | --- | --- | --- |
| ISO | QP | PSNR | SSIM | PSNR | SSIM | ΔPSNR | ΔSSIM | accuracy |
| 50 | 14 | 44.76 | 0.921395 | 42.65 | 0.931723 | −2.11 | 0.010328 | 1.21% |
| 100 | 17 | 46.87 | 0.953352 | 45.94 | 0.953841 | −0.93 | 0.000489 | 2.21% |
| 200 | 20 | 46.76 | 0.952867 | 45.17 | 0.952476 | −1.59 | −0.00039 | −1.71% |
| 400 | 24 | 46.26 | 0.943054 | 44.78 | 0.943326 | −1.48 | 0.000272 | −0.71% |
| 800 | 25 | 45.67 | 0.931178 | 46.72 | 0.932873 | 1.05 | 0.001695 | 2.13% |
| 1600 | 28 | 45.24 | 0.949991 | 46.79 | 0.950736 | 1.55 | 0.000745 | −0.83% |
| 3200 | 32 | 46.91 | 0.945293 | 45.64 | 0.943729 | −1.27 | −0.00156 | 1.98% |
|  |  |  | Average |  |  | −0.68 | 0.001653 | 0.61% |

Embodiment 3

Embodiment 3 of the present invention corresponds to a "cloud camera" system based on the cloud camera-cloud ISP architecture scheme. As shown in FIG. 19, in combination with cloud semantic analyzing, optimization processing method of the image is further improved.

In Embodiment 3 of the present invention, before the step S510, at least two raw image portions of the raw image to be processed are determined by dividing the raw image to be processed according to a predetermined division method.

Particularly, the semantic definition information determined by the semantic analyzing module of the cloud server is acquired.

Wherein, the semantic definition information includes at least one of the following: human body related features, organism related features, environment related features and characters, for example, human face, hair, clothing, characters, buildings, etc.

The raw image to be processed is divided into at least two semantic regions according to acquired semantic definition information and the at least two semantic regions are determined as the at least two raw image portions.

Then, in the step S510, related coding information corresponding to at least one raw image portion is determined according to feature information of the at least one raw image portion.

Particularly, when the related coding information includes related perceptual distortion information and an encoding parameter, for any one of raw image portions, a perceptual distortion value of each coding unit in the raw image portion is determined according to a set of feature values of each coding unit in the raw image portion and based on a trained first deep learning model corresponding to the raw image portion; and an encoding parameter of each coding unit in the raw image portion is determined according to the set of feature values of each coding unit in the raw image portion and based on a trained second deep learning model corresponding to the raw image portion.

Or, when the related coding information includes related perceptual distortion information and an encoding parameter, for any one of raw image portions, a perceptual distortion sensitivity type of each coding unit in the raw image portion is determined according to the set of feature values of each coding unit in the raw image portion and based on a trained first mathematical model corresponding to the raw image portion; and the encoding parameter of each coding unit in the raw image portion is determined according to the set of feature values of each coding unit in the aw image portion and based on a trained second mathematical model corresponding to the raw image portion.

Then, in the step S520, the at least one raw image portion is encoded according to the related coding information corresponding to the at least one raw image portion.

The at least two divided raw image portions are encoded respectively and transmitted to the cloud server.

In one implementation, each semantic region of the raw image is processed by the deep learning model according to perceptual distortion. Similarly, the encoding process includes a prediction process and a quantization process.

Optionally, in the prediction process, first, multiple first deep learning models are trained to process encoding of the image. The training may be real-time training or offline training. The real-time training is applicable to encoding and compressing of raw videos, and the off-line training is applicable to encoding and compressing of raw videos and raw images.

Wherein, the real-time training is performed on the terminal. In the prediction process, the hierarchical structure of the deep learning network corresponding to the real-time training includes:

1) a data collection layer configured to collect the previous processed image, the raw image corresponding to the previous processed image and the residual image of each coding unit in the previous processed image;

2) a semantic division layer configured to divide the raw image corresponding to the previous processed image into different semantic regions according to the acquired semantic definition information:

3) a feature extraction layer configured to obtain a set of feature values of each coding unit within each semantic region in the raw image corresponding to the previous processed image to constitute sets of training data, wherein the feature values contained in the set of feature values and the calculation method thereof are the same as those of Embodiment 1, that is, the number of the sets of training data in this step corresponds to the number of semantic regions;

4) a perceptual distortion evaluation layer configured to acquire the perceptual distortion value of each coding unit within each semantic region in the raw image corresponding to the previous processed image, wherein the method for calculating the perceptual distortion value is the same as that of Embodiment 1; and 5) a multilayer convolutional neural network layer configured to input, for each semantic region in the raw image corresponding to the previous processed image, the raw image within the semantic region, as well the residual image of each coding unit, the set of feature values of each coding unit and the perceptual distortion value of each coding unit within the semantic region to the multilayer convolutional neural network for training to obtain one first deep learning model, that is, the number of semantic regions divided in this step corresponds to the number of corresponding trained first deep learning models.

The off-line training may be performed on the server side or may be performed on the terminal. In the prediction process, the hierarchical structure of the deep learning network corresponding to the off-line training includes:

1) a data collection layer configured to collect the historical processed image, the raw image corresponding to the historical processed image and the residual image of each coding unit in the historical processed image;

2) a semantic division layer configured to divide the raw image corresponding to the historical processed image into different semantic regions according to the acquired semantic definition information:

3) a feature extraction layer configured to obtain a set of feature values of each coding unit within each semantic region in the raw image corresponding to the historical processed image to constitute sets of training data, wherein the feature values contained in the set of feature values and the calculation method thereof are the same as those of Embodiment 1, that is, the number of the sets of training data in this step corresponds to the number of semantic regions;

4) a perceptual distortion evaluation layer configured to acquire the perceptual distortion value of each coding unit within each semantic region in the raw image corresponding to the historical processed image, wherein the method for calculating the perceptual distortion value is the same as that of Embodiment 1; and 5) a multilayer convolutional neural network layer configured to input, for each semantic region in the raw image corresponding to the historical processed image, the raw image within the semantic region, as well the residual image of each coding unit, the set of feature values of each coding unit and the perceptual distortion value of each coding unit within the semantic region to the multilayer convolutional neural network for training to obtain one first deep learning model, that is, the number of semantic regions divided in this step corresponds to the number of corresponding trained first deep learning models.

Then, in the prediction process, the hierarchical structure of the deep learning network used when applying multiple first deep learning models to process the raw image to be processed includes:

1) a data collection layer configured to acquire a raw image to be processed;

2) a semantic division layer configured to divide the raw image to be processed into different semantic regions according to the acquired semantic definition information;

3) a feature extraction layer configured to obtain a set of feature values of each coding unit within each semantic region in the raw image to be processed to constitute sets of training data, wherein the number of the sets of training data corresponds to the number of semantic regions; and 4) a multilayer convolutional neural network layer configured to input the set of feature values of each coding unit within each semantic region in the raw image to be processed and the residual image of each coding unit to a corresponding trained first deep learning model respectively, and output the perceptual distortion value of each coding unit in each semantic region of the raw image to be processed.

Then, the rate-distortion cost of each candidate prediction mode for each coding unit in each semantic region is calculated by the determined perceptual distortion value, and a prediction mode having the lowest rate-distortion cost is selected as the optimal prediction mode.

Optionally, in the quantization process, multiple second deep learning models need to be trained to process the encoding of the raw image. Similarly, the training may be real-time training or off-line training. The real-time training is applicable to encoding and compressing of raw videos, and the off-line training is applicable to encoding and compressing of raw videos and raw images.

Wherein, the real-time training is performed on the terminal. In the quantization process, the hierarchical structure of the deep learning network corresponding to the real-time training includes:

1) a data collection layer configured to collect the previous processed image, the raw image corresponding to the previous processed image, the encoding parameter and the number of bits used for encoding of each coding unit in the previous processed image;

2) a semantic division layer configured to divide the raw image corresponding to the previous processed image into different semantic regions according to the acquired semantic definition information;

3) a feature extraction layer configured to obtain a set of feature values of each coding unit within each semantic region in the raw image corresponding to the previous processed image to constitute sets of training data, wherein the number of the sets of training data corresponds to the number of semantic regions; and 4) a perceptual distortion evaluation layer configured to acquire the perceptual distortion value of each coding unit within each semantic region in the raw image corresponding to the previous processed image; and 5) a multilayer convolutional neural network layer configured to input, for each semantic region in the raw image corresponding to the previous processed image, the raw image within the semantic region, as well the encoding parameter and the number of bits used for encoding of each coding unit, the set of feature values of each coding unit and the perceptual distortion value of each coding unit within the semantic region to the multilayer convolutional neural network for training to obtain one second deep learning model, that is, the number of semantic regions divided in this step corresponds to the number of corresponding trained second deep learning models.

The off-line training may be performed on the server side or may be performed on the terminal. In the quantization process, the hierarchical structure of the deep learning network corresponding to the off-line training includes:

1) a data collection layer configured to collect the historical processed image, the raw image corresponding to the historical processed image, the encoding parameter and the number of bits used for encoding of each coding unit in the historical processed image;

2) a semantic division layer configured to divide the raw image corresponding to the historical processed image into different semantic regions according to the acquired semantic definition information;

3) a feature extraction layer configured to obtain a set of feature values of each coding unit within each semantic region in the raw image corresponding to the historical processed image to constitute sets of training data, wherein the number of the sets of training data corresponds to the number of semantic regions;

4) a perceptual distortion evaluation layer configured to acquire the perceptual distortion value of each coding unit within each semantic region in the raw image corresponding to the historical processed image; and 5) a multilayer convolutional neural network layer configured to input, for each semantic region in the raw image corresponding to the historical processed image, the raw image within the semantic region, as well the encoding parameter and the number of bits used for encoding of each coding unit, the set of feature values of each coding unit and the perceptual distortion value of each coding unit within the semantic region to the multilayer convolutional neural network for training to obtain one second deep learning model, that is, the number of semantic regions divided in this step corresponds to the number of corresponding trained second deep learning models.

Then, in the quantization process, the hierarchical structure of the deep learning network used when applying multiple second deep learning models to process the raw image to be processed includes:

1) a data collection layer configured to acquire a raw image to be processed;

2) a semantic division layer configured to divide the raw image to be processed into different semantic regions according to the acquired semantic definition information;

3) a feature extraction layer configured to obtain a set of feature values of each coding unit within each semantic region in the raw image to be processed to constitute sets of training data, wherein the number of the sets of training data corresponds to the number of semantic regions; and 4) a multilayer convolutional neural network layer configured to input the set of feature values of each coding unit within each semantic region in the raw image to be processed and the target number of bits of the raw image to be processed to the corresponding trained second deep learning model, and output the quantization parameter of each coding unit in each semantic region of the raw image to be processed, wherein the target number of bits of the raw image to be processed is determined according to the network bandwidth.

It is to be noted that, in Embodiment 3 of the present invention, the method for obtaining the set of feature values and the method for calculating the perceptual distortion value are the same as those of Embodiment 1 and will not be repeated here.

In another implementation, the encoding method related to the mathematical model method is applied. After acquiring the raw image to be processed, the terminal encodes the raw image to be processed according to perceptual distortion.

Optionally, multiple first mathematical models and multiple second mathematical models need to be trained to process the encoding of the raw image. The training may be real-time training which is applicable to the compressing of raw videos or off-line training which is applicable to the compressing of raw videos and raw images.

Wherein, the real-time training is performed on the terminal. The real-time training of the first mathematical model is as follows:

the previous processed image and the raw image corresponding to the previous processed image are acquired;

the raw image corresponding to the previous processed image is divided into different semantic regions according to the semantic definition information of the cloud;

a set of feature values of each coding unit within each semantic region in the raw image to be processed is acquired to constitute sets of training data, wherein the number of the sets of training data corresponds to the number of semantic regions; and the perceptual distortion sensitivity type and the corresponding weighting factor of each coding unit in each corresponding semantic region of the previous processed image and in the raw image corresponding to the previous processed image are calculated.

Corresponding to each semantic region, multiple corresponding first mathematical models may be trained by the above data.

The off-line training may be performed on the server side or may be performed on the terminal. The off-line training of the first mathematical model is as follows:

the historical processed image and the raw image corresponding to the historical processed image are acquired;

the raw image corresponding to the historical processed image is divided into different semantic regions according to the semantic definition information of the cloud;

a set of feature values of each coding unit within each semantic region in the raw image to be processed is acquired to constitute sets of training data, wherein the number of the sets of training data corresponds to the number of semantic regions; and the perceptual distortion sensitivity type and the corresponding weighting factor of each coding unit in each corresponding semantic region of the historical processed image and the raw image corresponding to the historical processed image are calculated.

Corresponding to each semantic region, multiple corresponding first mathematical models may be trained by the above data.

Optionally, the real-time training is performed on the terminal. The real-time training of the second mathematical model is as follows:

the raw image corresponding to the previous processed image is divided into different semantic regions according to the semantic definition information of the cloud;

the encoding parameter and the number of bits used for encoding of each coding unit within each semantic region corresponding to the previous processed image are acquired; and a set of feature values of each coding unit in each semantic region in the raw image corresponding to the previous processed image is calculated.

Corresponding to each semantic region, multiple corresponding second mathematical models may be trained by the above data.

The off-line training may be performed on the server side or may be performed on the terminal. The off-line training of the second mathematical model is as follows:

the raw image corresponding to the historical processed image is divided into different semantic regions according to the semantic definition information of the cloud;

the encoding parameter and the number of bits used for encoding of each coding unit within each semantic region corresponding to the historical processed image are acquired; and a set of feature values of each coding unit in each semantic region in the raw image corresponding to the historical processed image is calculated.

Corresponding to each semantic region, multiple corresponding second mathematical models may be trained by the above data.

Optionally, the specific process of applying the first mathematical model to process the raw image to be processed includes steps of:

acquiring a raw image to be processed;

dividing the raw image to be processed into different semantic regions according to the semantic definition information of the cloud;

acquiring a set of feature values of each coding unit within each semantic region in the raw image to be processed to constitute sets of training data, wherein the number of the sets of training data corresponds to the number of semantic regions; and obtaining the perceptual distortion sensitivity type and the corresponding weighting factor (i.e. the weighted factor w) of each coding unit within each semantic region by multiple corresponding trained first mathematical models according to the data and obtaining the target number of bits of each coding unit.

Optionally, the specific process of applying the second mathematical model to process the raw image to be processed includes steps of:

obtaining a set of feature values of each coding unit in each semantic region of the raw image to be processed, the encoding parameters and the numbers of bits used for encoding of encoded coding units, preferably, acquiring the sets of feature values, the encoding parameters and the numbers of bits used for encoding of encoded coding units adjacent to each coding unit; and obtaining the quantization parameter of each coding unit in each semantic region by calculating by means of multiple corresponding trained second mathematical models according to the data.

The method for obtaining the set of feature values, the method for calculating the feature values and the method for calculating perceptual differences are the same as those of Embodiment 2, the first mathematical model and the second mathematical model are also the same as those of Embodiment 2 and will not be repeated here.

Then, the terminal may execute the encoding process in the step S520 and transmit at least two encoded raw image portions to the cloud server. That is, after each semantic region is encoded, a compressed bit-stream of the raw image to be processed is generated and transmitted to the cloud server.

The image and video decoder of the cloud server decodes the received compressed bit-stream to obtain the reconstructed image. Then, the reconstructed raw image is analyzed and optimized by the cloud semantic analyzing module and the ISP module and transmitted to the terminal, for example, a mobile phone of the user.

The step of optimizing the raw image according to the result of semantic analyzing by the cloud ISP module includes steps of:

performing denoising, color collection and whitening on human face regions;

performing edge texture enhancement on hair, character and clothing regions; and performing color collection and edge texture enhancement on building regions.

In Embodiment 3 of the present invention, the specific decoding process by the cloud server may refer to the above Embodiment 1 and will not be repeated here.

Then, an optimized image portion, which is generated after a reconstructed raw image is optimized by the Image Signal Processor (ISP) module of the cloud server, is received, and the reconstructed raw image is reconstructed based on the at least two raw image portions.

Embodiment 4

Embodiment 4 of the present invention corresponds to a "cloud camera" system based on the cloud camera-cloud ISP architecture scheme. As shown in FIG. 20, the raw image to be processed is compressed into two independent bit-streams which are transmitted to the cloud server, respectively.

In Embodiment 4 of the present invention, before the step S510, at least two raw image portions of the raw image to be processed are determined by dividing the raw image to be processed according to a predetermined division method.

Particularly, the raw image to be processed is divided into at least two raw image portions according to predetermined image features.

The raw image to be processed is divided into a first raw image portion and a second raw image portion.

Wherein, as shown in FIGS. 21 and 22, the first raw image portion includes any one of the following situations:

a low-frequency image portion of the raw image to be processed;

a low-resolution image portion of the raw image to be processed; and an edge information image portion and a down-sampled image portion of the raw image to be processed;

or, an image which may contain other information.

The second raw image portion is the remaining image portion, except for the first raw image portion, of the raw image portion to be processed.

Optionally, the division scheme for the first raw image portion and the second raw image portion may also be determined according to the demand of the cloud semantic analyzing module.

Then, in the step S510, related coding information corresponding to at least one raw image portion is determined according to feature information of the at least one raw image portion.

Particularly, when the related coding information includes related perceptual distortion information and an encoding parameter, for any one of raw image portions, a perceptual distortion value of each coding unit in the raw image portion is determined according to a set of feature values of each coding unit in the raw image portion and based on a trained first deep learning model corresponding to the raw image portion; and an encoding parameter of each coding unit in the raw image portion is determined according to the set of feature values of each coding unit in the raw image portion and based on a trained second deep learning model corresponding to the raw image portion.

Or, when the related coding information includes related perceptual distortion information and an encoding parameter, for any one of raw image portions, a perceptual distortion sensitivity type of each coding unit in the raw image portion is determined according to the set of feature values of each coding unit in the raw image portion and based on a trained first mathematical model corresponding to the raw image portion; and the encoding parameter of each coding unit in the raw image portion is determined according to the set of feature values of each coding unit in the raw image portion and based on a trained second mathematical model corresponding to the raw image portion.

Then, in the step S520, the at least one raw image portion is encoded according to the related coding information corresponding to the at least one raw image portion.

The at least two encoded raw image portions are transmitted to the cloud server, respectively.

It can be known that, the difference between Embodiment 4 and Embodiments 1, 2 and 3 of the present invention is that: the raw image to be processed is divided into two raw image portions (which will be described as a portion A and a portion B hereinafter), and the two raw image portions are compressed into two bit-streams (which will be described as a bit-stream A and a bit-stream B hereinafter) which are then transmitted to the cloud in a sequential order.

As an example, the terminal first compresses the portion A of the raw image to be processed to generate a bit-stream A and transmits the bit-stream A to the cloud server.

When the cloud server receives the bit-stream A, the cloud decoder decodes the bitstream A. and the portion A of the reconstructed raw image is input to the cloud semantic analyzing module to obtain the result of semantic analyzing of the raw image. Meanwhile, the terminal compresses the portion B of the raw image to be processed to generate a bit-stream B and transmits the bit-stream B to the cloud server.

When the cloud server receives the bit-stream B, the cloud decoder decodes the bitstream B, and the reconstructed portion B of the raw image and the reconstructed portion A of the raw image are combined into a complete reconstructed raw image.

The result of semantic analyzing and the complete reconstructed raw image are input to the cloud ISP module for optimization.

As shown in FIG. 23, the encoding method according to Embodiment 4 of the present invention has the following advantages:

reduction of the transmission delay: the terminal begins to transmit the bit-stream B when the cloud decoder receives and begins to decode the bit-stream A;

reduction of the semantic analyzing delay: since the bit-stream A contains only part of information of the raw image, the semantic analyzing may be quickened; and reduction of the decoding delay: the cloud decoder decodes the received bit-stream B when the cloud semantic analyzing module processes the bit-stream A.

It can be known that, in the application scene with high real-time requirement, compared with single-bit-stream method used in Embodiments 1, 2 and 3, in Embodiment 4 of the present invention, the overall delay of the system can be reduced, as shown in FIG. 24.

In the practical application, the terminal first encodes the portion A.

In one implementation, the portion A of the raw image is processed by a deep learning model according to perceptual distortion. Similarly, the encoding process includes a prediction process and a quantization process.

Optionally, in the prediction process of the portion A, first, the first deep learning model for the portion A is trained to process encoding of the image. The training may be real-time training or off-line training. The real-time training is applicable to the encoding and compressing of raw videos, and the off-line training is applicable to the encoding and compressing of raw videos and raw images.

Wherein, the real-time training is performed on the terminal. In the prediction process of the portion A, the hierarchical structure of the deep learning network corresponding to the real-time training includes:

1) a data collection layer configured to collect the previous processed image, the raw image corresponding to the previous processed image and the residual image of each coding unit in the previous processed image;

2) an image division layer configured to divide the raw image corresponding to the previous processed image into a portion A and a portion B, divide the previous processed image into a portion A and a portion B, and divided the residual image of each coding unit in the previous processed image into a portion A and a portion B;

3) a feature extraction layer configured to obtain a set of feature values of each coding unit in the portion A in the raw image corresponding to the previous processed image, where the feature values contained in the set of feature values and the calculation method thereof are the same as those of Embodiment 1;

4) a perceptual distortion evaluation layer configured to acquire the perceptual distortion value of each coding unit in the portion A in the raw image corresponding to the previous processed image, wherein the method for calculating the perceptual distortion value is the same as that of Embodiment 1; and 5) a multilayer convolutional neural network layer configured to input the portion A in the raw image corresponding to the previous processed image, as well the residual image of each coding unit, the set of feature values of each coding unit and the perceptual distortion value of each coding unit in the portion A to the multilayer convolutional neural network for training to obtain a first deep learning model for the portion A.

The off-line training may be performed on the server side or may be performed on the terminal. In the prediction process of the portion A, the hierarchical structure of the deep learning network corresponding to the off-line training includes:

1) a data collection layer configured to collect the historical processed image, the raw image corresponding to the historical processed image and the residual image of each coding unit in the historical processed image;

2) an image division layer configured to divide the raw image corresponding to the historical processed image into a portion A and a portion B, divide the historical processed image into a portion A and a portion B, and divide the residual image of each coding unit in the historical processed image into a portion A and a portion B;

3) a feature extraction layer configured to obtain a set of feature values of each coding unit in the portion A in the raw image corresponding to the historical processed image, wherein the feature values contained in the set of feature values and the calculation method thereof are the same as those of Embodiment 1;

4) a perceptual distortion evaluation layer configured to acquire the perceptual distortion value of each coding unit in the portion A in the raw image corresponding to the historical processed image, wherein the method for calculating the perceptual distortion value is the same as that of Embodiment 1; and 5) a multilayer convolutional neural network layer configured to input the portion A in the raw image corresponding to the historical processed image, as well the residual image of each coding unit, the set of feature values of each coding unit and the perceptual distortion value of each coding unit in the portion A to the multilayer convolutional neural network for training to obtain a first deep learning model for the portion A.

Then, in the prediction process of the portion A, the hierarchical structure of the deep learning network used when applying the first deep learning model for the portion A to process the portion A includes:

1) a data collection layer configured to acquire a raw image to be processed;

2) an image division layer configured to divide the raw image to be processed into a portion A and a portion B;

3) a feature extraction layer configured to obtain a set of feature values of each coding unit in the portion A of the raw image to be processed; and 4) a multilayer convolutional neural network layer configured to input the set of feature values of each coding unit in the portion A of the raw image to be processed and the residual image of each coding unit to the trained first deep learning model for the portion A respectively, and output the perceptual distortion value of each coding unit in the portion A.

Then, the rate-distortion cost of each candidate prediction mode for each coding unit in each semantic region is calculated by the determined perceptual distortion value and a prediction mode having the lowest rate-distortion cost is selected as the optimal prediction mode.

Optionally, in the quantization process of the portion A, the second deep learning model for the portion A needs to be trained to process encoding of the portion A. Similarly, the training may be real-time training or off-line training. The real-time training is applicable to the encoding and compressing of raw videos, and the off-line training is applicable to the encoding and compressing of raw videos and raw images.

Wherein, the real-time training is performed on the terminal. In the quantization process of the portion A, the hierarchical structure of the deep learning network corresponding to the real-time training includes:

1) a data collection layer configured to collect the previous processed image, the raw image corresponding to the previous processed image, the encoding parameter and the number of bits used for encoding of each coding unit in the previous processed image;

2) an image division layer configured to divide the raw image corresponding to the previous processed image into a portion A and a portion B and divide the previous processed image into a portion A and a portion B;

3) a feature extraction layer configured to obtain a set of feature values of each coding unit in the portion A in the raw image corresponding to the previous processed image;

4) a perceptual distortion evaluation layer configured to acquire the perceptual distortion value of each coding unit in the portion A in the raw image corresponding to the previous processed image; and 5) a multilayer convolutional neural network layer configured to input the portion A of the raw image corresponding to the previous processed image, as well the encoding parameter and the number of bits used for encoding of each coding unit, the set of feature values of each coding unit and the perceptual distortion value of each coding unit in the portion A to the multilayer convolutional neural network for training to obtain a second deep learning model for the portion A.

The off-line training may be performed on the server side or may be performed on the terminal. In the quantization process of the portion A, the hierarchical structure of the deep learning network corresponding to the off-line training includes:

1) a data collection layer configured to collect the historical processed image, the raw image corresponding to the historical processed image, the encoding parameter and the number of bits used for encoding of each coding unit in the historical processed image;

2) an image division layer configured to divide the raw image corresponding to the historical processed image into a portion A and a portion B and divide the historical processed image into a portion A and a portion B;

3) a feature extraction layer configured to obtain a set of feature values of each coding unit in the portion A in the raw image corresponding to the historical processed image;

4) a perceptual distortion evaluation layer configured to acquire the perceptual distortion value of each coding unit in the portion A in the raw image corresponding to the historical processed image; and 5) a multilayer convolutional neural network layer configured to input the portion A of the raw image corresponding to the historical processed image, as well the encoding parameter and the number of bits used for encoding of each coding unit, the set of feature values of each coding unit and the perceptual distortion value of each coding unit in the portion A to the multilayer convolutional neural network for training to obtain a second deep learning model for the portion A.

Then, in the quantization process of the portion A, the hierarchical structure of the deep learning network used when applying the second deep learning model for the portion A to process the portion A of the raw image to be processed includes:

1) a data collection layer configured to acquire a raw image to be processed;

2) an image division layer configured to divide the raw image to be processed into a portion A and a portion B;

3) a feature extraction layer configured to obtain a set of feature values of each coding unit in the portion A of the raw image to be processed;

4) a multilayer convolutional neural network layer configured to input the set of feature values of each coding unit in the portion A of the raw image to be processed and the target number of bits of the raw image to be processed to the trained second deep learning model for the portion A respectively, and output the quantization parameter of each coding unit in the portion A.

The method for obtaining the set of feature values and the method for calculating the perceptual distortion value are the same as those of Embodiment 1 and will not be repeated here.

In another implementation, the encoding method related to the mathematical model method is applied. After the terminal acquires a raw image to be processed, the raw image is divided into a portion A and a portion B, and the terminal encodes the portion A according to perceptual distortion.

Optionally, the first mathematical model for the portion A and the second mathematical model for the portion A need to be trained to process the encoding of the portion A. The training may be real-time training which is applicable to the compressing of raw videos or off-line training which is applicable to the compressing of raw videos and raw images.

Wherein, the real-time training is performed on the terminal. The real-time training of the first mathematical model for the portion A is as follows:

the previous processed image and the raw image corresponding to the previous processed image are acquired;

the raw image corresponding to the previous processed image is divided into a portion A and a portion B, and the previous processed image is divided into a portion A and a portion B;

a set of feature values of each coding unit in the portion A in the raw image corresponding to the previous processed image is obtained; and the perceptual distortion sensitivity type and the corresponding weighting factor of each coding unit in the portion A of the previous processed image and the portion A of the raw image corresponding to the previous processed image are calculated.

The first mathematical model for the portion A may be trained by the above data.

The off-line training may be performed on the server side or may be performed on the terminal. The off-line training of the first mathematical model for the portion A is as follows:

the historical processed image and the raw image corresponding to the historical processed image are acquired;

the raw image corresponding to the historical processed image is divided into a portion A and a portion B, and the historical processed image is divided into a portion A and a portion B;

a set of feature values of each coding unit in the portion A in the raw image corresponding to the historical processed image is obtained; and the perceptual distortion sensitivity type and the corresponding weighting factor of each coding unit in the portion A of the historical processed image and the portion A of the raw image corresponding to the historical processed image are calculated.

The first mathematical model for the portion A may be trained by the above data.

Optionally, the real-time training is performed on the terminal. The real-time training of the second mathematical model for the portion A is as follows:

the raw image corresponding to the previous processed image is divided into a portion A and a portion B;

an encoding parameter and a number of bits used for encoding of each coding unit in the portion A are acquired; and a set of feature values of each coding unit in the portion A is calculated.

The second mathematical model for the portion A may be trained by the above data.

The off-line training may be performed on the server side or may be performed on the terminal. The off-line training of the second mathematical model for the portion A is as follows:

the raw image corresponding to the historical processed image is divided into a portion A and a portion B;

an encoding parameter and a number of bits used for encoding of each coding unit in the portion A are acquired; and a set of feature values of each coding unit in the portion A is calculated.

The second mathematical model for the portion A may be trained by the above data.

Optionally, the specific process of applying the first mathematical model for the portion A to process the portion A of the raw image to be processed includes steps of:

acquiring a raw image to be processed;

dividing the raw image to be processed into a portion A and a portion B;

acquiring a set of feature values of each coding unit in the portion A; and calculating the perceptual distortion sensitivity type and the corresponding weighting factor (i.e. the weighted factor w) of each coding unit in the portion A by the trained first mathematical model for the portion A according to the data and obtaining the target number of bits of each coding unit in the portion A.

Optionally, the specific process of applying the second mathematical model for the portion A to process the portion A of the raw image to be processed includes steps of:

obtaining the set of feature values of each coding unit in the portion A of the raw image to be processed, and the encoding parameters and the numbers of bits used for encoding of encoded coding units; preferably, acquiring the sets of feature values, the encoding parameters and the numbers of bits used for encoding of encoded coding units adjacent to each coding unit; and calculating the quantization parameter of each coding unit in the portion A by the trained second mathematical model for the portion A according to the data.

The method for obtaining the set of feature values, the method for calculating the feature values and the method for calculating perceptual differences are the same as those of Embodiment 2, the first mathematical model and the second mathematical model are also the same as those of Embodiment 2 and will not be repeated here.

Then, the terminal compresses the portion A into a bit-stream A and transmits it to the cloud server.

The cloud server decodes the received bit-stream A to obtain the reconstructed portion A. The decoding process may refer to Embodiment 1 and will not be repeated here.

The cloud semantic analyzing module analyzes the reconstructed portion A to obtain the result of semantic analyzing.

After transmitting the bit-stream A, the terminal may begin to encode the portion B.

In one implementation, the portion B of the raw image is processed by a deep learning model according to perceptual distortion. Similarly, the encoding process includes a prediction process and a quantization process.

Optionally, in the prediction process of the portion B, first, the first deep learning model for the portion B is trained to process the encoding of the image. The training may be real-time training or off-line training. The real-time training is applicable to the encoding and compressing of raw videos, and the off-line training is applicable to the encoding and compressing of raw videos and raw images.

Wherein, the real-time training is performed on the terminal. In the prediction process of the portion B, the hierarchical structure of the deep learning network corresponding to the real-time training includes:

1) a data collection layer configured to collect the portion B of the previous processed image, the portion B of the raw image corresponding to the previous processed image and the portion B of the residual image of each coding unit in the previous processed image;

2) a feature extraction layer configured to obtain a set of feature values of each coding unit in the portion B in the raw image corresponding to the previous processed image, wherein the feature values contained in the set of feature values and the calculation method thereof are the same as those of Embodiment 1;

3) a perceptual distortion evaluation layer configured to acquire the perceptual distortion value of each coding unit in the portion B in the raw image corresponding to the previous processed image, wherein the method for calculating the perceptual distortion value is the same as that of Embodiment 1;

4) a multilayer convolutional neural network layer configured to input the portion B in the raw image corresponding to the previous processed image, as well the residual image of each coding unit in the portion B, the set of feature values of each coding unit and the perceptual distortion value of each coding unit to the multilayer convolutional neural network for training to obtain a first deep learning model for the portion B.

The off-line training may be performed on the server side or may be performed on the terminal. In the prediction process of the portion B, the hierarchical structure of the deep learning network corresponding to the off-line training includes:

1) a data collection layer configured to collect the portion B of the historical processed image, the portion B of the raw image corresponding to the historical processed image and the portion B of the residual image of each coding unit in the historical processed image;

2) a feature extraction layer configured to obtain a set of feature values of each coding unit in the portion B in the raw image corresponding to the historical processed image, wherein the feature values contained in the set of feature values and the calculation method thereof are the same as those of Embodiment 1;

3) a perceptual distortion evaluation layer configured to acquire the perceptual distortion value of each coding unit in the portion B in the raw image corresponding to the historical processed image, wherein the method for calculating the perceptual distortion value is the same as that of Embodiment 1; and 4) a multilayer convolutional neural network layer configured to input the portion B in the raw image corresponding to the historical processed image, as well the residual image of each coding unit, the set of feature values of each coding unit and the perceptual distortion value of each coding unit in the portion B to the multilayer convolutional neural network for training to obtain a first deep learning model for the portion B.

Then, in the prediction process of the portion B, the hierarchical structure of the deep learning network used when applying the first deep learning model for the portion B to process the portion B includes:

1) a data collection layer configured to acquire a portion B of the raw image to be processed;

2) a feature extraction layer configured to obtain a set of feature values of each coding unit in the portion B of the raw image to be processed;

3) a multilayer convolutional neural network layer configured to input the set of feature values of each coding unit in the portion B of the raw image to be processed and the residual image of each coding unit to the trained first deep learning model for the portion B respectively, and output the perceptual distortion value of each coding unit in the portion B.

Then, the rate-distortion cost of each candidate prediction mode for each coding unit in each semantic region is calculated by the determined perceptual distortion value, and a prediction mode having the lowest rate-distortion cost is selected as the optimal prediction mode.

Optionally, in the quantization process of the portion B, the second deep learning model for the portion B needs to be trained to process encoding of the portion B. Similarly, the training may be real-time training or off-line training. The real-time training is applicable to the encoding and compressing of raw videos, and the off-line training is applicable to the encoding and compressing of raw videos and raw images.

Wherein, the real-time training is performed on the terminal. In the quantization process of the portion B, the hierarchical structure of the deep learning network corresponding to the real-time training includes:

1) a data collection layer configured to collect the portion B of the previous processed image, the portion B of the raw image corresponding to the previous processed image, the encoding parameters and the number of bits used for encoding each coding unit in the portion B of the previous processed image;

2) a feature extraction layer configured to obtain a set of feature values of each coding unit in the portion B in the raw image corresponding to the previous processed image;

3) a perceptual distortion evaluation layer configured to acquire the perceptual distortion value of each coding unit in the portion B in the raw image corresponding to the previous processed image; and 4) a multilayer convolutional neural network layer configured to input the portion B of the raw image corresponding to the previous processed image, as well the encoding parameter and the number of bits used for encoding of each coding unit, the set of feature values of each coding unit and the perceptual distortion value of each coding unit in the portion B to the multilayer convolutional neural network for training to obtain a second deep learning model for the portion B.

The off-line training may be performed on the server side or may be performed on the terminal. In the quantization process of the portion B, the hierarchical structure of the deep learning network corresponding to the off-line training includes:

1) a data collection layer configured to collect the portion B of the historical processed image, the portion B of the raw image corresponding to the historical processed image, the encoding parameters and the number of bits used for encoding each coding unit in the portion B of the historical processed image;

2) a feature extraction layer configured to obtain a set of feature values of each coding unit in the portion B in the raw image corresponding to the historical processed image;

3) a perceptual distortion evaluation layer configured to acquire the perceptual distortion value of each coding unit in the portion B in the raw image corresponding to the historical processed image; and 4) a multilayer convolutional neural network layer configured to input the portion B of the raw image corresponding to the historical processed image, as well the encoding parameter and the number of bits used for encoding of each coding unit, the set of feature values of each coding unit and the perceptual distortion value of each coding unit in the portion B to the multilayer convolutional neural network for training to obtain a second deep learning model for the portion B.

Then, in the quantization process of the portion B, the hierarchical structure of the deep learning network used when applying the second deep learning model for the portion B to process the portion B of the raw image to be processed includes:

1) a data collection layer configured to acquire a portion B of the raw image to be processed:

2) a feature extraction layer configured to obtain a set of feature values of each coding unit in the portion B of the raw image to be processed; and 3) a multilayer convolutional neural network layer configured to input the set of feature values of each coding unit in the portion B of the raw image to be processed and the target number of bits of the raw image to be processed to the trained second deep learning model for the portion B respectively, and output the quantization parameter of each coding unit in the portion B.

The method for obtaining the set of feature values and the method for calculating the perceptual distortion value are the same as those of Embodiment 1 and will not be repeated here.

In another implementation, the encoding method related to the mathematical model method is applied. After acquiring the portion B of the raw image to be processed, the terminal encodes the portion B according to perceptual distortion.

Optionally, the first mathematical model for the portion B and the second mathematical model for the portion B need to be trained to process the encoding of the portion B. The training may be real-time training which is applicable to the compressing of raw videos or off-line training which is applicable to the compressing of raw videos and raw images.

Wherein, the real-time training is performed on the terminal. The real-time training of the first mathematical model for the portion B is as follows:

the portion B of the previous processed image and the portion B of the raw image corresponding to the previous processed image are acquired;

a set of feature values of each coding unit in the portion B in the raw image corresponding to the previous processed image is obtained; and the perceptual distortion sensitivity type and the corresponding weighting factor of each coding unit in the portion B of the previous processed image and the portion B of the raw image corresponding to the previous processed image are calculated.

The first mathematical model for the portion B may be trained by the above data.

The off-line training may be performed on the server side or may be performed on the terminal. The off-line training of the first mathematical model for the portion B is as follows:

the portion B of the historical processed image and the portion B of the raw image corresponding to the historical processed image are acquired:

a set of feature values of each coding unit in the portion B in the raw image corresponding to the historical processed image is obtained; and the perceptual distortion sensitivity type and the corresponding weighting factor of each coding unit in the portion B of the historical processed image and the portion B of the raw image corresponding to the historical processed image are calculated.

The first mathematical model for the portion B may be trained by the above data.

Optionally, the real-time training is performed on the terminal. The real-time training of the second mathematical model for the portion B is as follows:

the encoding parameter and the number of bits used for encoding of each coding unit in the portion B of the raw image to be processed are acquired; and a set of feature values of each coding unit in the portion B is calculated.

The second mathematical model for the portion B may be trained by the above data.

The off-line training may be performed on the server side or may be performed on the terminal. The off-line training of the second mathematical model for the portion B is as follows:

the encoding parameter and the number of bits used for encoding of each coding unit in the portion B of the raw image to be processed are acquired; and a set of feature values of each coding unit in the portion B is calculated.

The second mathematical model for the portion B may be trained by the above data.

Optionally, the specific process of applying the first mathematical model for the portion B to process the portion B of the raw image to be processed includes steps of:

acquiring the portion B of the raw image to be processed;
acquiring the set of feature values of each coding unit in the portion B; and
calculating the perceptual distortion sensitivity type and the corresponding weighting factor (i.e. the weighted factor w) of each coding unit in the portion B by the trained first mathematical model for the portion B according to the data and obtaining the target number of bits of each coding unit in the portion B.

Optionally, the specific process of applying the second mathematical model for the portion B to process the raw image to be processed includes steps of:

obtaining a set of feature values of each coding unit in the portion B of the raw image to be processed, as well the encoding parameters and the numbers of bits used for encoding of encoded coding units in the portion B; preferably, acquiring the sets of feature values, the encoding parameters and the numbers of bits used for encoding of encoded coding units adjacent to each coding unit; and calculating the quantization parameter of each coding unit in the portion B by the trained second mathematical model for the portion B according to the data.

The method for obtaining the set of feature values, the method for calculating the feature values and the method for calculating perceptual differences are the same as those of Embodiment 2, the first mathematical model and the second mathematical model are also the same as those of Embodiment 2 and will not be repeated here.

Then, the terminal compresses the portion B into a bit-stream B and transmits it to the cloud server.

The cloud server decodes the received bit-stream B to obtain the reconstructed portion B. The decoding process may refer to Embodiment 1 and will not be repeated here.

The reconstructed portion A and the reconstructed portion B are combined into a complete raw image to be processed.

The cloud server inputs the obtained result of semantic analyzing and the combined complete raw image to be processed to the cloud ISP module for optimization.

An optimized image portion, which is generated after a reconstructed raw image is optimized by the Image Signal Processor (ISP) module of the cloud server, is received, and the reconstructed raw image is reconstructed based on the at least two raw image portions.

Embodiment 5

Embodiment 5 of the present invention corresponds to a "cloud camera" system based on the cloud camera-cloud semantic analyzing architecture scheme.

In Embodiment 5 of the present invention, before the step S510, at least two raw image portions of the raw image to be processed are determined by dividing the raw image to be processed according to a predetermined division method.

Particularly, the raw image to be processed is divided into at least two raw image portions according to predetermined image features.

The raw image to be processed is divided into a first raw image portion and a second raw image portion.

Wherein, as shown in FIGS. 25, 26 and 27, the first raw image portion includes any one of the following situations:

a low-frequency image portion of the raw image to be processed;

a low-resolution image portion of the raw image to be processed; and an edge information image portion and a down-sampled image portion of the raw image to be processed;

or, an image which may contain other information.

The second raw image portion is the remaining image portion, except for the first raw image portion, of the raw image portion to be processed.

Optionally, the division scheme for the first raw image portion and the second raw image portion may also be determined according to the demand of the cloud semantic analyzing module.

Then, in the step S510, related coding information corresponding to at least one raw image portion is determined according to feature information of the at least one raw image portion.

Particularly, when the related coding information includes related perceptual distortion information and an encoding parameter, for any one of raw image portions, a perceptual distortion value of each coding unit in the raw image portion is determined according to a set of feature values of each coding unit in the raw image portion and based on a trained first deep learning model corresponding to the raw image portion; and an encoding parameter of each coding unit in the raw image portion is determined according to the set of feature values of each coding unit in the raw image portion and based on a trained second deep learning model corresponding to the raw image portion.

Or, when the related coding information includes related perceptual distortion information and an encoding parameter, for any one of raw image portions, a perceptual distortion sensitivity type of each coding unit in the raw image portion is determined according to the set of feature values of each coding unit in the raw image portion and based on a trained first mathematical model corresponding to the raw image portion; and the encoding parameter of each coding unit in the raw image portion is determined according to the set of feature values of each coding unit in the raw image portion and based on a trained second mathematical model corresponding to the raw image portion.

Then, in the step S520, the at least one raw image portion is encoded according to the related coding information corresponding to the at least one raw image portion.

In the practical application, the first raw image portion is encoded to obtain the encoded first raw image portion, and the encoded first raw image portion is transmitted to the cloud server.

In the step S1320, the result of semantic analyzing, which is generated after the semantic analyzing module of the cloud server performs semantic analyzing on the decoded first raw image portion, is received.

In the step S1330, the raw image to be processed is optimized according to the result of semantic analyzing to generate an optimized image.

As shown in FIG. 14, the difference between Embodiment 5 and Embodiments 1, 2, 3 and 4 of the present invention is that: the raw image to be processed is divided into two raw image portions (which will be described as a portion A and a portion B hereinafter, wherein the portion A corresponds to the first raw image portion), only the portion A is compressed to generate a bit-stream A, and the bit-stream A is transmitted to the semantic analyzing module of the cloud for semantic analyzing. The ISP module is on the terminal, not in the cloud. The ISP module processes original raw images, not the compressed reconstructed images.

In the practical application, the terminal first encodes the portion A.

Wherein, the way of encoding the portion A may refer to the way of encoding the portion A in Embodiment 4 and will not be repeated here.

In Embodiment 5 of the present invention, after determining the quantization parameter of each coding unit in the portion A, the terminal compresses the portion A into a bit-stream A and transmits it to the cloud server.

The cloud server decodes the received bit-stream A to obtain the reconstructed portion A. The decoding process may refer to Embodiment 1 and will not be repeated here.

The cloud semantic analyzing module analyzes the reconstructed portion A to obtain the result of semantic analyzing and transmits it to the terminal.

The step of optimizing the complete raw image to be processed according to the received result of semantic analyzing by the terminal includes steps of:

performing denoising, color collection and whitening on human face regions;

performing edge texture enhancement on hair, character and clothing regions; and performing color collection and edge texture enhancement on building regions.

Embodiment 6

Embodiment 6 of the present invention further provides a terminal, as shown in FIG. 28, including:

a determining module 2810 configured to determine related coding information corresponding to the raw image to be processed according to feature information of a raw image to be processed; and an encoding module 2820 configured to encode the raw image to be processed according to the related coding information.

Optionally, the determining module 2810 is specifically configured to determine related perceptual distortion information corresponding to the raw image to be processed, according to the feature information of the raw image to be processed; and optionally, the encoding module 2820 is specifically configured to encode the raw image to be processed, according to the related perceptual distortion information.

Optionally, the encoding module 2820 is specifically configured to proportionate perceptual distortion sensitivity and an allocated number of bits in the encoding process, according to the related perceptual distortion information.

Optionally, the determining module 2810 is specifically configured to determine the related perceptual distortion information and an encoding parameter corresponding to the raw image to be processed, according to the feature information of the raw image to be processed; and the encoding module 2820 is specifically configured to encode the raw image to be processed, according to the related perceptual distortion information and the encoding parameter.

Optionally, the determining module 2810 is specifically configured to determine a perceptual distortion value of each coding unit in the raw image to be processed, according to a set of feature values of each coding unit in the raw image to be processed and based on a trained first deep learning model; and the determining module 2810 is specifically configured to determine the encoding parameter of each coding unit in the raw image to be processed, according to the set of feature values of each coding unit in the raw image to be processed and based on a trained second deep learning model.

Optionally, the encoding module 2820 is specifically configured to determine an optimal prediction mode for each coding unit, according to the perceptual distortion value of each coding unit in the raw image to be processed; and the encoding module 2820 is specifically configured to encode the raw image to be processed, according to the optimal prediction mode and the encoding parameter of each coding unit in the raw image to be processed.

Optionally, the determining module 2810 is specifically configured to determine, according to the set of feature values of each coding unit in the raw image to be processed and based on a trained first mathematical model, a perceptual distortion sensitivity type of each coding unit in the raw image to be processed; and the determining module 2810 is specifically configured to determine, according to the set of feature values of each coding unit in the raw image to be processed and based on a trained second mathematical model, the encoding parameter of each coding unit in the raw image to be processed.

Optionally, the determining module 2810 is specifically configured to determine, according to the perceptual distortion sensitivity type of each coding unit in the raw image to be processed, a weighting factor corresponding to each coding unit; and the determining module 2810 is specifically configured to determine, according to the weighting factor corresponding to each coding unit, a target number of bits of each coding unit; and the determining module 2810 is specifically configured to determine, according to the set of feature values and the target number of bits of each coding unit and based on the trained second mathematical model, the encoding parameter of each coding unit in the raw image to be processed;

wherein, the target number of bits corresponding to each coding unit is proportional to the weighting factor, and the weighting factor corresponding to each coding unit is proportional to perceptual sensitivity of the perceptual distortion sensitivity type.

Optionally, the determining module 2810 is specifically configured to determine the encoding parameter corresponding to the raw image to be processed, according to the feature information of the raw image to be processed and corresponding related perceptual distortion information.

The terminal according to Embodiment 6 of the present invention further includes:

a division module configured to determine, by dividing the raw image to be processed according to a predetermined division method, at least two raw image portions of the raw image to be processed;

a determining module 2810 specifically configured to determine, according to feature information of at least one raw image portion, related coding information corresponding to the at least one raw image portion; and an encoding module 2820 specifically configured to encode the at least one raw image portion, according to the related coding information corresponding to the at least one raw image portion.

Optionally, when the related coding information includes related perceptual distortion information and an encoding parameter, for any one of raw image portions, the determining module 2810 is specifically configured to determine a perceptual distortion value of each coding unit in the raw image portion, according to a set of feature values of each coding unit in the raw image portion and based on a trained first deep learning model corresponding to the raw image portion; and the determining module 2810 is specifically configured to determine an encoding parameter of each coding unit in the raw image portion, according to the set of feature values of each coding unit in the raw image portion and based on a trained second deep learning model corresponding to the raw image portion.

Optionally, when the related coding information includes related perceptual distortion information and an encoding parameter, for any one of raw image portions, the determining module 2810 is specifically configured to determine a perceptual distortion sensitivity type of each coding unit in the raw image portion, according to the set of feature values of each coding unit in the raw image portion and based on a trained first mathematical model corresponding to the raw image portion; and the determining module 2810 is specifically configured to determine the encoding parameter of each coding unit in the raw image portion, according to the set of feature values of each coding unit in the raw image portion and based on a trained second mathematical model corresponding to the raw image portion.

Optionally, the division module is specifically configured to divide the raw image to be processed into at least two semantic regions according to acquired semantic definition information and determining the at least two semantic regions as the at least two raw image portions; or the division module is specifically configured to divide, according to predetermined image features, the raw image to be processed into at least two raw image portions.

Optionally, the division module is specifically configured to acquire the semantic definition information determined by a semantic analyzing module of a cloud server; and the semantic definition information includes at least one of the following: human body related features, organism related features, environment related features and characters.

Optionally, the division module is specifically configured to divide the raw image to be processed into a first raw image portion and a second raw image portion, and the first raw image portion includes any one of the following situations:

a low-frequency image portion of the raw image to be processed;

a low-resolution image portion of the raw image to be processed; and an edge information image portion and a down-sampled image portion of the raw image to be processed; and the second raw image portion is the remaining image portion of the raw image portion to be processed, except for the first raw image portion.

Optionally, the encoding parameter includes a quantization parameter.

Optionally, the set of feature values includes at least one of the following parameters:

brightness; smoothness; edge strength; edge directional consistency; and texture complexity.

Optionally, the terminal according to Embodiment 6 of the present invention further includes:

a transmitting module configured to transmit the encoded raw image to the cloud server, and a receiving module configured to receive an optimized image which is generated after the raw image to be processed is optimized by an Image Signal Processor (ISP) module of the cloud server.

Optionally, the transmitting module is specifically configured to transmit the at least two encoded raw image portions to the cloud server, respectively; and the receiving module is specifically configured to receive an optimized image portion which is generated after a reconstructed raw image is optimized by the Image Signal Processor (ISP) module of the cloud server, wherein the reconstructed raw image is reconstructed based on the at least two raw image portions.

Optionally, the transmitting module is specifically configured to transmit the encoded first raw image portion to the cloud server; and the receiving module is specifically configured to receive a result of semantic analyzing which is generated after the semantic analyzing module of the cloud server performs semantic analyzing on the encoded first raw image portion.

Optionally, the terminal according to Embodiment 6 of the present invention further includes:

an optimization module configured to generate an optimized image by optimizing the raw image to be processed according to the result of semantic analyzing.

The implementation principle and the resulting technical effects of the terminal according to Embodiment 6 of the present invention are the same as those of the method embodiment described above. For brief description, the part which is not mentioned in Embodiment 6 of the present invention may refer to corresponding content in the method embodiments described above and will not be repeated here.

The terminal may include any terminal apparatuses such as a computer, a mobile phone, a tablet computer, a Personal Digital Assistant (PDA), a Point of Sales (POS), and a vehicle-borne computer.

The terminal includes a memory, a processor, and a computer programs which are stored on the memory and may be run on the processor. The processor implements the method according to any one of the embodiments when executing the programs.

Wherein, the memory may be configured to store software programs and modules, and the processor executes various function applications and data processing by running the software programs and modules stored in the memory. The memory may mainly include a program storage area and a data storage area. In addition, the memory may include a high-speed random access memory, and may also include a non-volatile memory (for example, at least one magnetic disk storage device, and a flash memory device) or other volatile solid state storage devices.

The processor is a control center which connects parts of the whole terminal by various interfaces and lines and executes various functions and data processing by running or executing the software programs and/or modules stored in the memory and invoking data stored in the memory, in order to monitor the whole terminal. Optionally, the processor may include one or more processing units; preferably, the processor may be integrated with an application processor and a modem processor, wherein the application processor mainly processes operating systems, user interfaces and application programs, and the modem processor mainly processes wireless communication. It may be understood that the modem processor may not be integrated into the processor.

The embodiments of the present invention further provide a readable storage medium having computer programs stored thereon that, when executed by the processor, implement the method according to any one of the embodiments.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present invention may be alternated, changed, combined or deleted. Further, other steps, measures and solutions in the operations, methods and flows already discussed in the present invention can also be alternated, changed, rearranged, decomposed, combined or deleted. Further, the steps, measures and solutions of the prior art in the operations, methods and operations disclosed in the present invention can also be alternated, changed, rearranged, decomposed, combined or deleted.

The foregoing descriptions are merely some implementations of the present invention. It should be pointed out that, to a person of ordinary skill in the art, various improvements and modifications can be made without departing from the principle of the present invention, and these improvements and modifications shall be regarded as falling into the protection scope of the present invention.

The invention claimed is:

1. A method for encoding an image, comprising:
    determining, based on feature information of a raw image to be processed, related coding information corresponding to the raw image; and
    encoding, based on the related coding information, the raw image to be processed,
    wherein determining, based on the feature information of the raw image, the related coding information corresponding to the raw image comprises:
        determining, based on a set of feature values of each coding unit in the raw image and based on a trained first deep learning model, a perceptual distortion value of each coding unit in the raw image; and
        determining, based on the feature information of the raw image, related perceptual distortion information corresponding to the raw image and an encoding parameter corresponding to the raw image,
    wherein determining, based on the feature information of the raw image, the encoding parameter corresponding to the raw image comprises:
        determining, based on the set of feature values of each coding unit in the raw image and based on a trained second deep learning model, the encoding parameter of each coding unit in the raw image,
    wherein encoding, based on the related coding information, the raw image comprises:
        encoding, based on the related perceptual distortion information and the encoding parameter, the raw image.

2. The method of claim 1, wherein perceptual distortion sensitivity is in proportion to an allocated number of bits in the encoding process, based on the related perceptual distortion information.

3. The method of claim 1, wherein the step of encoding, based on the related perceptual distortion information and the encoding parameter, the raw image comprises steps of:
    determining, based on the perceptual distortion value of each coding unit in the raw image to be processed, an optimal prediction mode for each coding unit and encoding, based on the optimal prediction mode and the encoding parameter of each coding unit in the raw image, the raw image.

4. The method of claim 1, the method further comprising:
    determining, based on feature information of the raw image, related coding information corresponding to the raw image after determining related perceptual distortion information corresponding to the raw image,
    wherein determining, based on feature information of the raw image, the related coding information corresponding to the raw image comprises:
    determining, based on the feature information of the raw image and corresponding the related perceptual distortion information, the encoding parameter corresponding to the raw image.

5. The method of claim 1, before determining, based on feature information of the raw image, the related coding information corresponding to the raw image, the method further comprising:
    determining, by dividing the raw image based on a predetermined division way, at least two raw image portions of the raw image; and
    determining, based on feature information of the raw image, the related coding information corresponding to the raw image,
    wherein determining, based on feature information of the raw image, the related coding information corresponding to the raw image comprises:
        determining, based on feature information of at least one raw image portion, the related coding information corresponding to the at least one raw image portion; and
        encoding, based on the related coding information, the raw image, and
    wherein encoding, based on the related coding information, the raw image to be processed comprises:
        encoding, based on the related coding information corresponding to the at least one raw image portion, the at least one raw image portion.

6. The method of claim 5, wherein determining, by dividing the raw image based on a predetermined division way, at least two raw image portions of the raw image comprises at least one of:
    dividing the raw image into at least two semantic regions based on acquired semantic definition information and determining the at least two semantic regions as the at least two raw image portions; or dividing, based on predetermined image features, the raw image into at least two raw image portions.

7. The method of claim 6, wherein, when the raw image is divided into a first raw image portion and a second raw image portion, the first raw image portion comprises any one of:

a low-frequency image portion of the raw image;

a low-resolution image portion of the raw image; or an edge information image portion and a down-sampled image portion of the raw image; and wherein the second raw image portion is the remaining image portion, except for the first raw image portion, of the raw image portion.

8. The method of claim 1, wherein the encoding parameter comprises a quantization parameter.

9. The method of claim 7, the method further comprising:

transmitting the encoded first raw image portion to the cloud server;

receiving a result of semantic analyzing which is generated after the semantic analyzing module of the cloud server performs semantic analyzing on the encoded first raw image portion; and generating an optimized image by optimizing the raw image based on the result of semantic analyzing.

10. A terminal, comprising:

a memory; and a processor configured to:

determine, based on feature information of a raw image to be processed, related coding information corresponding to the raw image, wherein the processor is configured to determine, based on the feature information of the raw image, the related coding information corresponding to the raw image by determining based on a set of feature values of each coding unit in the raw image and based on a trained first deep learning model, a perceptual distortion value of each coding unit in the raw image; and determine, based on the feature information of the raw image, related perceptual distortion information corresponding to the raw image and an encoding parameter corresponding to the raw image, wherein the processor is configured to determine, based on the feature information of the raw image, the related perceptual distortion information corresponding to the raw image by determining, based on the set of feature values of each coding unit in the raw image and based on a trained second deep learning model, the encoding parameter of each coding unit in the raw image, encode, based on the related coding information, the raw image, and encode, based on the related perceptual distortion information and the encoding parameter, the raw image.

11. The terminal of claim 10, wherein perceptual distortion sensitivity is in proportion to an allocated number of bits in the encoding process, based on the related perceptual distortion information.

12. The terminal of claim 10, the processor is further configured to:

determine, based on the perceptual distortion value of each coding unit in the raw image, an optimal prediction mode for each coding unit; and encode, based on the optimal prediction mode and the encoding parameter of each coding unit in the raw image.

13. The terminal of claim 10, wherein the processor is further configured to:

determine, by dividing the raw image to be processed based on a predetermined division way, at least two raw image portions of the raw image;

determine, based on feature information of the raw image to be processed, the related coding information corresponding to the raw image;

determine, based on feature information of at least one raw image portion, the related coding information corresponding to the at least one raw image portion;

encode, based on the related coding information, the raw image, and encode, based on the related coding information corresponding to the at least one raw image portion, the at least one raw image portion.

* * * * *